United States Patent [19]
Holmes

[11] Patent Number: 5,497,451
[45] Date of Patent: Mar. 5, 1996

[54] COMPUTERIZED METHOD FOR DECOMPOSING A GEOMETRIC MODEL OF SURFACE OR VOLUME INTO FINITE ELEMENTS

[76] Inventor: David Holmes, Box 308, Uncasvile, Conn. 06382

[21] Appl. No.: 823,109

[22] Filed: Jan. 22, 1992

[51] Int. Cl.⁶ ........................................ G06F 15/62
[52] U.S. Cl. .................. 395/120; 395/133; 395/127; 395/142
[58] Field of Search .................... 395/119, 120, 395/123, 124, 127, 133, 140–143; 364/191, 474.24, 571.01

[56] References Cited

U.S. PATENT DOCUMENTS

| | | | |
|---|---|---|---|
| 4,819,161 | 4/1989 | Konno et al. | 364/191 |
| 5,023,800 | 6/1991 | Carver et al. | 364/474.24 |
| 5,033,014 | 7/1991 | Carver et al. | 364/571.01 |

*Primary Examiner*—Almis Jankus
*Attorney, Agent, or Firm*—Robert S. Smith

[57] ABSTRACT

A computerized process for defining finite elements in a surface or volume for ultimately predicting a physical characteristic of the surface or volume. For the surface, for example, the process includes a first step of inputting surface boundary point coordinates of a geometric model of the surface to a computer system, the computer system including an image display screen displaying the geometric model. The process further includes preparing the boundary edges of surface by generating piecewise geometrically smooth bezier curves between boundary points and converting the bezier curves to cubic interpolation polynomials and defining evenly spaced points on each cubic interpolation polynomial and decomposing the surface with divider curves, if the surface is not already 3, 4, or 5 sided, into 3, 4, and 5 sided primitives. Thereafter, a determination is made of the largest acceptable element size and the number of elements disposed along each edge of each primitive. The next steps are readjusting one of the divider curves to match a closest even element vertices and mapping in 3 and 5 sided clusters and then preparing remaining 4 sided primitives for decomposition into 4 sided elements and mapping in elements and element patches. Thereafter, method includes the steps of optimising the elements in the mesh and writing the resulting mesh to a storage file.

22 Claims, 34 Drawing Sheets

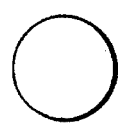 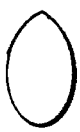   
FIG. 1A  FIG. 1B  FIG. 1C  FIG. 1D  FIG. 1E
  
FIG. 1A'  FIG. 1B'  FIG. 1C'
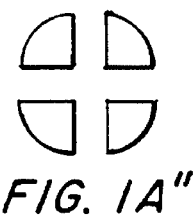
FIG. 1A"
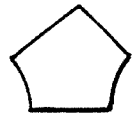  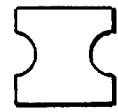
FIG. 1F  FIG. 1G  FIG. 1H
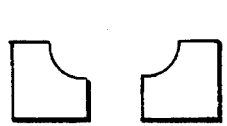 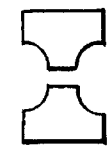
FIG. 1G'  FIG. 1H'
FIG. 1H"

SURFACE DECOMPOSITION FLOW CHART

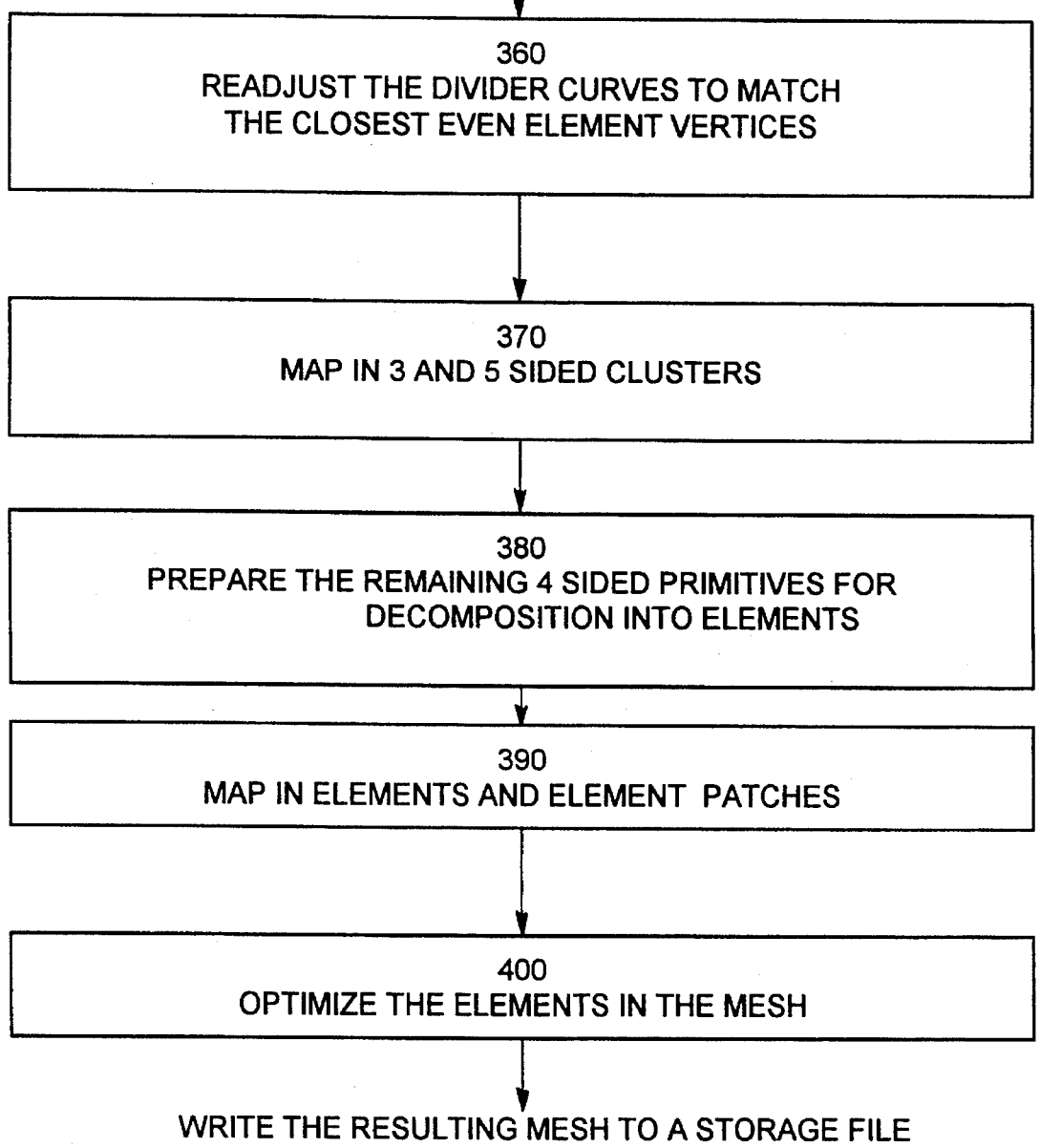

FIG. 60C

320
DECOMPOSE ANY SURFACE WITH DIVIDER CURVES IF IT IS NOT
3, 4, OR 5 SIDED

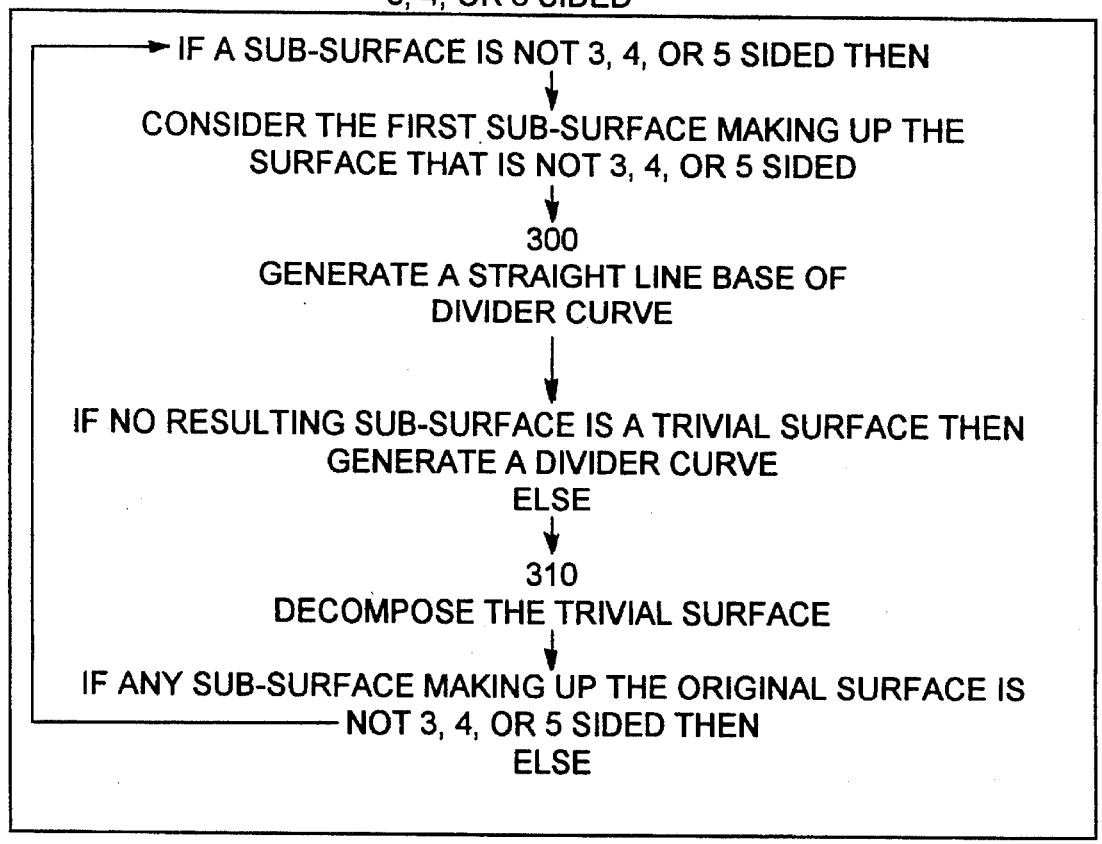

IF A SUB-SURFACE IS NOT 3, 4, OR 5 SIDED THEN

CONSIDER THE FIRST SUB-SURFACE MAKING UP THE
SURFACE THAT IS NOT 3, 4, OR 5 SIDED

300
GENERATE A STRAIGHT LINE BASE OF
DIVIDER CURVE

IF NO RESULTING SUB-SURFACE IS A TRIVIAL SURFACE THEN
GENERATE A DIVIDER CURVE
ELSE

310
DECOMPOSE THE TRIVIAL SURFACE

IF ANY SUB-SURFACE MAKING UP THE ORIGINAL SURFACE IS
NOT 3, 4, OR 5 SIDED THEN
ELSE

FIG. 60E

**330
PREPARE THE BOUNDARY EDGES**

GENERATE PIECEWISE GEOMETRICALLY SMOOTH BEZIER CURVES
BETWEEN THE BOUNDARY POINTS
↓
CONVERT BEZIER CURVES TO CUBIC INTERPOLATION
POLYNOMIALS
↓
DEFINE EVENLY SPACED POINTS ON EACH CUBIC INTERPOLATION
POLYNOMIAL

**340
DETERMINE THE LARGEST ELEMENT SIZE**

FIND THE PRIMITIVE EDGE HAVING THE SHORTEST LENGTH
↓
DIVIDE THE LENGTH BY 4 USING THE RESULTING NUMBER AS THE
LARGEST POSSIBLE ELEMENT SIZE FOR THE SURFACE

**350
DETERMINE THE NUMBER OF ELEMENTS PER PRIMITIVE EDGE**

→ SPECIFY AN ELEMENT SIZE
↓
IF THE SPECIFIED ELEMENT SIZE IS GREATER THAN THE
└──── LARGEST POSSIBLE ELEMENT SIZE THEN
ELSE
↓
CALCULATE THE NEAREST EVEN NUMBER OF ELEMENTS ALONG
EACH PRIMITIVE EDGE BY DIVIDING EACH EDGE LENGTH BY THE
GIVEN ELEMENT SIZE AND ROUNDING THE RESULT OFF TO THE
NEAREST EVEN NUMBER

FIG. 60F

360
READJUST THE DIVIDER CURVES TO MATCH THE CLOSEST EVEN
ELEMENT VERTICES

CONSIDER THE LAST DIVIDER CURVE MADE

IF ONE OF THE ENDPOINTS OF ANOTHER DIVIDER
CURVE CONTACTS THE DIVIDER CURVE THEN RELOCATE
THE DIVIDER CURVE END POINT SO THAT IT IS
COMPATIBLE WITH THE VERTEX OF AN EVEN ELEMENT
LOCATED ON THE OTHER DIVIDER CURVE
ELSE

IF THERE IS ANOTHER DIVIDER CURVE PREVIOUSLY
CREATED PRIOR TO THE CURRENT DIVIDER CURVE
THEN CONSIDER THAT CURVE
ELSE

370
MAP IN 3 AND 5 SIDED CLUSTERS

OPTIMIZE THE 3 & 5 SIDED PRIMITIVES

OPTIMIZE THE SHAPE OF THE 3 AND 5 SIDED CLUSTERS IN THE 3
AND 5 SIDED PRIMITIVES

MAP 3 AND 5 SIDED CLUSTERS INTO THE 3 AND 5 SIDED PRIMITIVES

GENERATE THE REMAINING 4 SIDED PATCHES (PRIMITIVES) IN
EACH 3 AND 5 SIDED PRIMITIVE

FIG. 60G

380
PREPARE THE REMAINING 4 SIDED PRIMITIVES FOR DECOMPOSITION
INTO ELEMENTS

SPLIT EACH 4 SIDED PRIMITIVE INTO PATCH HALVES
↓
GENERATE LAYERS IN EACH HALF
↓
STORE THE LAYERS IN THE ORDER OF THE SIDE LENGTH OF EACH
LAYER DECREASING DIFFERENCE BETWEEN OPPOSING EDGE
LENGTHS ALONG THE CORRESPONDING PATCH HALF AXIS
↓
CALCULATE THE NEAREST EVEN NUMBER OF ELEMENTS ALONG
EACH LAYER EDGE PERPENDICULAR TO THE CORRESPONDING
PATCH AXIS BY DIVIDING EACH EDGE LENGTH BY THE GIVEN
ELEMENT SIZE
↓
DETERMINE THE NUMBER OF AND DIRECTION OF PATCHES PER
LAYER

390
MAP IN ELEMENTS AND ELEMENT PATCHES

PLACE ELEMENT PATCH CONFIGURATIONS INTO EACH LAYER IN
THE DESCENDING ORDER OF THE LIST REPEATEDLY UNTIL THE
DIFFERENCE IN THE NUMBER OF ELEMENTS ON EACH PATCH
HALF OPPOSING EDGE IS MATCHED
↓
MAP IN THE REMAINDER OF THE LAYERS WITH 2xN FILLER
ELEMENTS

FIGURE 61A

VOLUME DECOMPOSITION FLOW CHART

INPUT POINTS DEFINING THE BOUNDARIES OF EACH SURFACE OF THE VOLUME IN A SEQUENCE THAT PRODUCES AN OUTWARD POINTING NORMAL AWAY FROM THE VOLUME INTERIOR

↓

SETUP THE INITIAL SURFACE ADJACENCY DESCRIPTION FOR THE VOLUME

↓

INITIALIZE THE (1,1,1) VOLUME ADJACENCY ARRAY

↓

| 600 |
|---|
| IF THE VOLUME IS MULTIPLY CONNECTED THEN PREPARE IT FOR DECOMPOSITION |

↓

| 510 |
|---|
| EXCISE NON-LINEAR OR 3 SIDED VOLUMES FROM THE VOLUME WITH A GENERIC DIVIDER SURFACE |

↓

| 520 |
|---|
| DECOMPOSE REMAINING SUB VOLUMES WITHOUT 3,4, OR 5 SIDES INTO VOLUMES WITH 3,4, OR 5 SIDES WITH GENERIC SURFACES |

↓

| 530 |
|---|
| DECOMPOSE ANY COMPOSITE SUB VOLUMES WITH GENERIC DIVIDER SURFACES |

↓

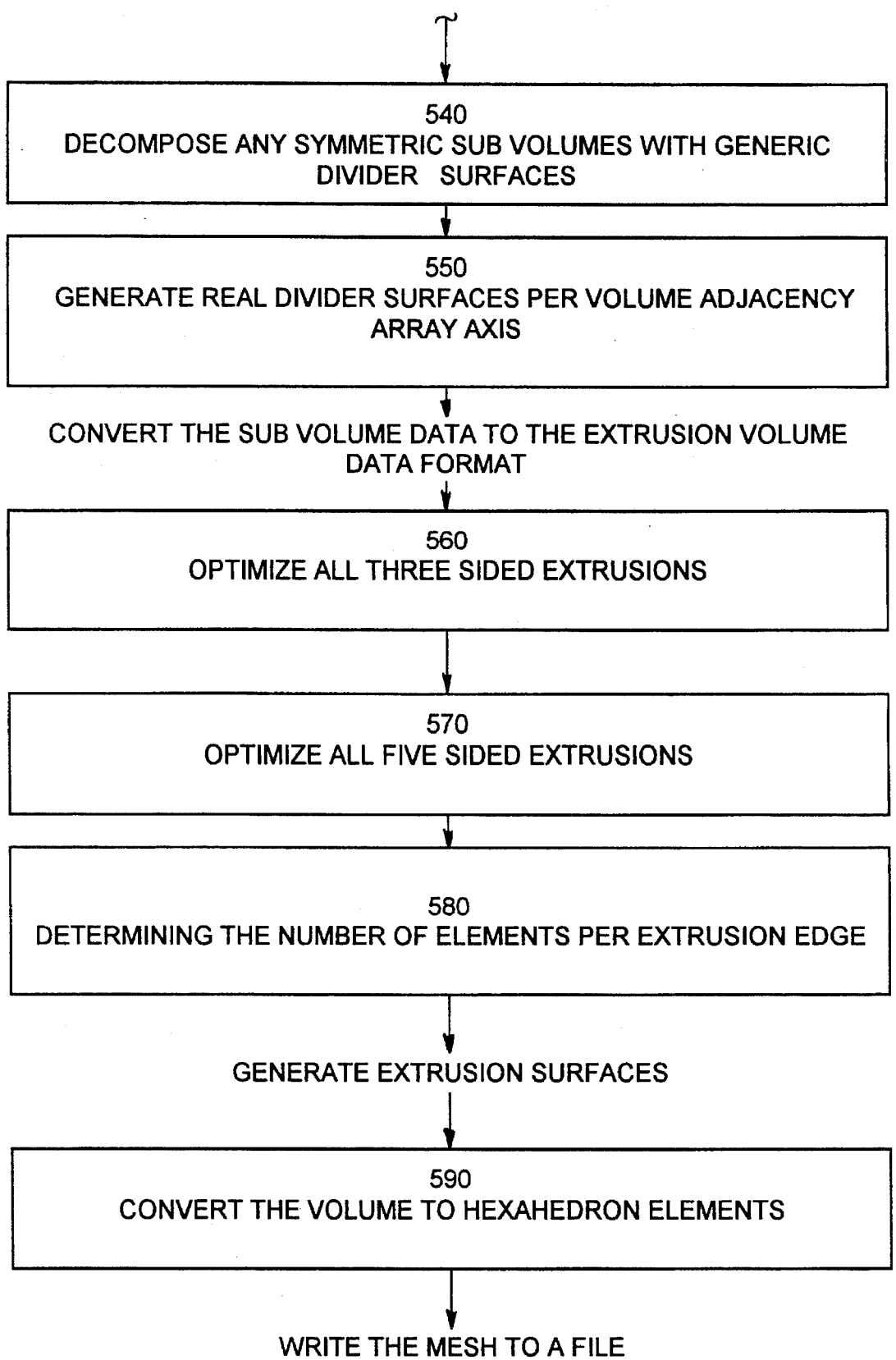

FIG. 6IC

**510
EXCISE NON-LINEAR OR 3 SIDED VOLUMES FROM THE VOLUME
WITH A GENERIC DIVIDER SURFACE**

IF THE VOLUME HAS ANY EDGES THAT ARE
ASSOCIATED WITH ONE OF THE NON-LINEAR VOLUMES
OR HAS AT LEAST ONE 3 SIDED SURFACE AND IS NOT
ALREADY A 3 SIDED EXTRUSION THEN

↓

PLACE ALL THE GENERIC DIVIDER SURFACES THAT ARE
NECESSARY TO EXCISE THE NON-LINEAR VOLUME
OR A 3 SIDED EXTRUSION FROM THE VOLUME

↓

**500
CONTINUE DECOMPOSITION THROUGH THE
VOLUME ADJACENCY ARRAY**

↓

IF THERE IS A NON-LINEAR VOLUME THEN
BREAK EXISTING NON-LINEAR EXTRUSIONS INTO 4
AND 5 SIDED EXTRUSIONS
ELSE

↓

**500
CONTINUE DECOMPOSITION THROUGH THE
VOLUME ADJACENCY ARRAY**

↓

CONSIDER ANOTHER NON LINEAR SUB VOLUME
OR A SUB VOLUME WITH AT LEAST ONE SURFACE THAT
HAS 3 EDGES FROM THE VOLUME ADJACENCY ARRAY
ELSE

FIG. 6IF

550
GENERATE REAL DIVIDER SURFACES PER VOLUME
ADJACENCY ARRAY AXIS

DEFINE THE ORIGINAL SURFACES OF THE VOLUME USING
SURFACE DECOMPOSITION
↓
IF THERE ARE ANY DIVIDER SURFACES THEN PLOT NXN MESHES
INTO EACH ORIGINAL SURFACE PRIMITIVE AND CALCULATE THE
SPACING OF EACH DIVIDER SURFACE EDGE ALONG THE
ORIGINAL SURFACE EDGES
↓
GENERATE SKELETON CURVES FOR THE NEW DIVIDER SURFACES
ON THE ORIGINAL VOLUME SURFACES
↓
MAP ALL THE DIVIDER SURFACE EDGES INTO THE ORIGINAL
VOLUME SURFACE PRIMITIVES BASED ON THE SKELETON CURVE
ENTRY AND EXIT POINTS OF THE SURFACE PRIMITIVES
↓
IF THERE IS MORE THAN ONE AXIS OF THE VOLUME ADJACENCY
ARRAY THEN LOCATE ANY DIVIDER SURFACE EDGE INTERSECTION
POINTS WITHIN EACH ORIGINAL SURFACE PRIMITIVE
ELSE
↓
IF THERE IS A FIRST AXIS OF DIVIDER SURFACES THEN DEFINE THE
SURFACES ALONG THE FIRST AXIS WITH THE NEW EDGES
ELSE
↓
IF THERE IS A SECOND AXIS OF DIVIDER SURFACES THEN
DEFINE THE DIVIDER SURFACES AND THE CURVES RESULTING
FROM SURFACE INTERSECTION WITH THE SURFACES ALONG THE
FIRST AXIS AS SKELETON CURVES BEGINNING AND ENDING AT THE
CORRESPONDING DIVIDER SURFACE EDGE INTERSECTION POINTS
DEFINED WITHIN THE ORIGINAL VOLUME SURFACE PRIMITIVES
ELSE
↓
IF THERE IS A THIRD AXIS OF DIVIDER SURFACES THEN DEFINE
THE DIVIDER SURFACES AND THE CURVES RESULTING FROM
SURFACE INTERSECTION WITH THE FIRST AND SECOND AXIS
SURFACES AS SKELETON CURVES USING THE SAME POINTS ON
THE FIRST AND SECOND SURFACES INTERSECTION CURVES AS
ONE OF THE CORNER VERTICES FOR THE RESULTING SUB-
SURFACES
ELSE

FIG. 61H

580
DETERMINING THE NUMBER OF ELEMENTS
PER EXTRUSION EDGE

```
┌─►SPECIFY THE NUMBER OF ELEMENTS PER EXTRUSION SURFACE
│                          EDGE
│                            │
│                            ▼
└───IF THE NUMBER OF ELEMENTS IS LESS THEN 4 AND NOT AN
                        EVEN NUMBER THEN
                             ELSE
```

590
CONVERT THE VOLUME TO HEXAHEDRON ELEMENTS

MAP 3, 4, OR 5 SIDED MESHES ONTO THE EXTRUSION SURFACES

↓

OPTIMIZE THE ELEMENTS FOR EACH EXTRUSION SURFACE
USING PROCEDURES FROM SURFACE DECOMPOSITION

↓

CONVERT THE MESH INTO HEXAHEDRON ELEMENTS

FIG. 61 I

600
IF THE VOLUME IS MULTIPLY CONNECTED THEN
PREPARE IT FOR DECOMPOSITION

IF THERE ARE ANY INTERIOR SURFACES WITHIN
AN ORIGINAL VOLUME SURFACE NOT PART OF A
DIVIDER SURFACE THEN CONSIDER THE
ORIGINAL SURFACE VOLUME WITH THE GREATEST
NUMBER OF INTERNAL SURFACES

↓

DECOMPOSE THE MULTIPLY CONNECTED VOLUME
SURFACE THAT HAS THE MOST INTERIOR SURFACES

↓

MATCH THE STRUCTURE OF THE DIVIDER CURVE
BASE LINES FOR THE INTERNAL SURFACES WITHIN
THE DECOMPOSED SURFACE BY DEFINING SKELETON
CURVES THAT IF NECESSARY PASS OVER VOLUME
EDGES BEGINNING AND ENDING AT THE TWO ENDS
OF A VOLUME LINKAGE

↓

GENERATE THE REAL EDGES THAT CONNECT
EACH DIVIDER CURVE BASE LINE BETWEEN
THE INTERIOR SURFACES OF THE VOLUME

↓

DEFINE THE REAL SURFACES USING THE
REAL EDGES
ELSE

COMPUTERIZED METHOD FOR DECOMPOSING A GEOMETRIC MODEL OF SURFACE OR VOLUME INTO FINITE ELEMENTS

BACKGROUND OF THE INVENTION

The invention relates generally to a numerical simulation. More particularly, the invention relates to a method for automatically decomposing a surface or volume to generate from a geometric model the finite elements to be used in the simulation. The process has application for structural analysis (including linear elasticity, vibration analysis and plasticity), electric and magnetic field analysis, fluid mechanics, heat transfer, solid modelling and various other applications. While the invention will be described in terms of decomposing a volume or surface it will be understood that the same techniques may be applied to other problem solutions.

Analytical solutions have been the historically dominant approach to many problems of this type. Analytical solutions are mathematically logical representations of problems that can also be solved with a numerical solution.

Despite the wide use of analytical solutions, numerical solutions such as the finite element method have become increasingly popular in the wake of advancing computer technology and is an accepted method of analysis both in industry and academia. The invention uses the finite element method. This method or process solves problems using convergent numerical analysis. The method mathematically defines a plurality of finite element which are representations of infinitesimal sections of a continuum.

An advantage of the finite element method over analytical solutions is that the finite element method can be applied to a much larger range of problems and is not limited to a small class of solution types as is the analytical solutions approach.

The finite element method includes three sequential steps: preprocessing, analysis, and post processing. The invention is concerned with the preprocessing phase in which a surface or volume is decomposed into finite elements. The analysis phase utilizes numerical methods and considerable emphasis has been placed on its development in the prior art. The existing techniques are quite sophisticated. The post processing phase involves the handling of large amounts of data produced by the analysis phase in order to present that data in a comprehensible manner. Both the analysis and post processing phases have been developed to a high level of sophistication. Commercial analysis packages exist to do analysis in specific technical areas such as linear elasticity, plasticity, heat transfer and fluids analysis.

The prior art includes various methods described in the following U.S. Patents. U.S. Pat. No. 4,941,114 describes a triangular mesh generation. It is generally recognized that finite elements that approach a cube of square are a more precise basis for analysis. Thus, the approach described in the patent is not a preferred approach to solving such problems.

U.S. Pat. No. 4,797,842 attempts to define a series of locus points that are used to define a natural flow or natural breakup of an object would naturally suggest a unique mathematical process. This approach is seemingly limited to quadrilaterals and triangles in the mesh generation process. Thus, inherently the approach in this patent also uses hexahedrons and prisms for volumes, quadrilaterals and triangles for surfaces. The accuracy of this approach is unsatisfactory because of the use of triangles in surface decomposition and prisms in surface decomposition. In addition the use of locus points requires additional data processing that is not necessary with the present invention.

U.S. Pat. No. 4,183,013 describes a system for extracting shape features from an object. The teachings are strictly limited to two dimensional surfaces and do not disclose a method for generating a finite element mesh.

It is generally recognized that a decomposition process that defines quadrilaterals or hexahedrons is preferable because the results are more precise. The prior art computerized surface and volume decomposition procedures have not been satisfactory because they cannot decompose many surfaces and volumes into respectively only quadrilaterals or hexahedrons.

Still another problem is that the prior art surface decomposition techniques do not lead to results which are as accurate as the method in accordance with the present invention. In some cases the prior art techniques have not conceptualized the procedures for decomposing all of the many shapes that are possible in an object.

It is an object of the invention to provide a more accurate and complete decomposition of surfaces and volumes.

It is an object of the invention to provide finite element generation that defines elements that approach either a square or cube shape.

SUMMARY OF THE INVENTION

It has now been found that these and other objects of the invention may be attained in a process for defining finite elements in a surface for ultimately predicting a physical characteristic of the surface which includes a first step of inputting surface boundary point coordinates of a geometric model of the surface to a computer system, the computer system including an image display screen displaying the geometric model. The process further includes preparing the boundary edges of the surface by generating piecewise geometrically smooth bezier curves between the boundary points and converting the bezier curves to cubic interpolation polynomials and defining evenly spaced points on each cubic interpolation polynomial and decomposing the surface with divider curves, if the surface is not already 3, 4, or 5 sided, into 3, 4, and 5 sided primitives. Thereafter a determination is made of the largest acceptable element size and the number of elements disposed along each edge of each primitive. The next steps are readjusting one of the divider curves to match the closest even element vertices and mapping in 3 and 5 sided clusters and then preparing the remaining 4 sided primitives for decomposition into 4 sided elements and mapping in elements and element patches. Thereafter the method includes the steps of optimizing the elements in the mesh and writing the resulting mesh to a storage file.

In some forms of the invention the method further includes determining if all sub-surfaces thereof remaining after definition of primitives are already 3, 4, or 5 sided and then considering a first sub-surface making up the surface that is not 3, 4, or 5 sided and then generating a straight line base of a divider curve. If no resulting sub-surface is a trivial surface then generating a divider curve and if a resulting surface is a trivial surface then decomposing the trivial surface.

The step of decomposing the trivial surface may include if one of the resulting sub-surfaces is trivial then placing an alternative extruded divider curve between the two longest edges of the sub-surface containing the shortest boundary edge and considering the part of the trivial surface that is not composed of the shortest boundary edge and generating a straight line base of divider curve, verifying successful decomposition of the sub-surface, and if decomposition of the trivial surface is unsuccessful then moving the alternative extruded divider curve along the two longest boundary edges away from the shortest base surface edge. Then if decomposition is successful generate a divider curve.

The decomposition of the trivial surface in some form of the invention includes generating a straight line base of a divider curve, finding two points not located on the extent of any two adjacent boundaries that are the closest together of any other corresponding two points on the boundaries of the surface, testing the resulting line segment to verify if both ends form angles which are substantially between 80 and 100 degrees with the surface boundary tangents and if these angles are not substantially between 80 and 100 degrees then excluding these two points.

The method may include the step of preparing the boundary edges by generating piecewise geometrically smooth bezier curves between the boundary points convert bezier curves to cubic interpolation polynomials and defining evenly spaced points on each cubic interpolation polynomial.

The method may include the step of determining the largest acceptable element size which includes finding the primitive edge having the shortest length, and divide the primitive edge having the shortest length by 4 using the resulting number as the largest possible element size for the surface.

The step of determining the number of elements disposed along each edge of each primitive may include specifying the largest element size and if the specified element size is greater than the largest possible element size then repeat the preceding step, if the specified element size is less than the largest possible element size calculate the nearest even number of elements along each primitive edge by dividing each edge length by the given element size and rounding the result off to the nearest even number.

The the step of readjusting one of the divider curves may include considering the next to last, in order of creation, divider curve that has been previously defined, if one of the endpoints of this divider curve contacts a previously created divider curve then relocating this divider curve end point so that it is compatible with the vertex of an even element located on the previously created divider curve; and sequentially consider the next divider curve, in opposite order of creation, if one of the endpoints contacts a previously created divider curve then relocate this divider curve end point so that it is compatible with the vertex of an even element located on the previously created divider curve.

The step of mapping in 3 and 5 sided clusters may includes optimizing the 3 and 5 sided primitives by optimizing the shape of the 3 and 5 sided clusters in the 3 and 5 sided primitives, mapping 3 and 5 sided clusters into the 3 and 5 sided primitives, generating the remaining 4 sided primitives in each 3 and 5 sided primitive.

The method may include a step of preparing the remaining 4 sided primitives for decomposition into 4 sided elements which includes splitting each 4 sided primitive into patch halves and generating layers in each half. This aspect of the invention may include storing the layers in the order of the decreasing difference between opposing edge lengths along the corresponding patch half axis, calculating the nearest even number of elements along each layer edge perpendicular to the corresponding patch axis by dividing each edge length by the given element size, and determining the number of and direction of patches per layer.

The step of mapping in elements and element patches may include placing element patch configurations into each layer in the descending order of the difference between opposing edge lengths repeatedly until the difference in the number of elements on each patch half opposing edge is matched, and mapping in the remainder of the layers with 2×N filler elements where N is any even integer greater than zero.

The step of optimizing the elements in the mesh includes the steps of sequentially optimizing all 3 sided cluster elements; optimizing all 5 sided cluster elements; and optimizing all elements having sequential included angles of substantially 60–90–120–90 degrees in each element patch configuration to more nearly have a more precise 60–90–120–90 degree angular relationship.

The method of defining defining finite elements in a volume for ultimately predicting a physical characteristic of the volume which includes a first step of inputting surface boundary point coordinates of a geometric model of the surface to a computer system, the computer system including an image display screen displaying the geometric model, inputting points defining the boundaries of each surface of the volume in a sequence that produces an outward pointing normal away from the volume interior, setting up the initial surface adjacency description for the volume, initializing the volume adjacency array, excising non-linear or 3 sided extrusions from the volume, decomposing remaining sub-volumes not having 3, 4, or 5 sides into volumes with 3, 4, or 5 sides, decomposing any composite sub-volumes, decomposing any symmetric sub-volumes, generating real divider surfaces for each volume adjacency array axis, converting the sub-volume data to the extrusion volume data format, optimizing all three sided extrusions, optimizing all five sided extrusions, determining the number of elements per extrusion edge, generating extrusion surfaces, converting the volume to hexahedron elements, and writing the mesh to a file.

The step of excising non-linear or 3 sided extrusions from the volume may include, if the volume has any edges that are associated with one of the non-linear volumes or has at least one 3 sided surface and is not already a 3 sided extrusion, the step of beginning placement of the generic divider surfaces for the decomposition of the corresponding sub-volume from a data file. Thereafter, this step includes creating all the generic divider surfaces that are necessary to excise the non-linear volume or a 3 sided extrusion from the volume, continuing decomposition through the volume adjacency array, and if there is a non-linear volume then break existing non-linear extrusion into 4 and 5 sided extrusions, continuing the decomposition through the volume adjacency array, and considering another non linear sub-volume or a sub-volume with at least one surface that has 3 edges.

The method may include a step of decomposing remaining sub-volumes without 3, 4, or 5 sides into volumes with 3, 4, or 5 sides that includes repetitively, for each sub-surface of the sub-volume not having 3, 4, or 5 edges and has the greatest number of edges of all other surfaces in the sub-volume, and generating the generic divider surface that has the greatest number of sides for the sub-volume starting it on the largest surface edges.

The method may include a step of decomposing any composite sub-volumes that, if any sub-volume is a composite volume, then creating a generic divider surface for the composite sub-volume, continuing decomposition through the volume adjacency array, and considering another composite volume from the volume adjacency array.

The method may include a step of decomposing any symmetric sub-volumes that includes creating the two predefined generic divider surfaces and continuing decomposition through the volume adjacency array by sequentially the steps for other symmetric volumes from the volume adjacency array.

The method may include the step of generating real divider surfaces that includes defining the original surfaces of the volume using surface decomposition, if there are any divider surfaces then plotting N×N meshes into each original surface primitive and calculating the spacing of each divider surface edge along the original surface edges, generating skeleton curves for the new divider surfaces on the original volume surfaces, mapping all the divider surface edges into the original volume surface primitives based on the skeleton curve entry and exit points of the surface primitives, if there is more than one axis of the volume adjacency array then locating any divider surface edge intersection points edge within each original surface primitive, if there is a first axis of divider surfaces then defining the surfaces along a first axis with the new edges, if there is a second axis of divider surfaces then defining the divider surfaces and the curves resulting from surface intersection with the surfaces along the first axis as skeleton curves beginning and ending at the corresponding divider surface edge intersection points defined within the original volume surface primitives, and if there is a third axis of divider surfaces then defining the divider surfaces and the curves resulting from surface intersection with the first and second axis surfaces as skeleton curves using the same points on the first and second surfaces intersection curves as one of the corner vertices for the resulting sub-surfaces.

The step of optimizing all three sided extrusions includes if a sub-volume is a first three sided extrusion then beginning optimizing the first 3 sided extrusion, continuing decomposition through the volume adjacency array, sequentially optimizing other sub-volumes from the volume adjacency array that are 3 sided extrusions.

The step of optimizing all five sided extrusions includes if a first sub-volume is a five sided extrusion then begin optimizing the first 5 side extrusion, and continuing decomposition through the volume adjacency array, and sequentially optimize other sub-volumes from the volume adjacency array that are 5 sided extrusions.

The step of determining the number of elements per extrusion edge may include inputting the number of elements per extrusion surface edge, and if the number of elements is less than 4 and not an even number then repeatting the preceding step.

The step of converting the volume to hexahedron elements includes mapping 3, 4, or 5 sided meshes onto the extrusion surfaces, optimizing the elements for each extrusion surface; and convert the mesh into hexahedron elements.

BRIEF DESCRIPTION OF THE DRAWING

The invention will be better understood by reference to the accompanying drawing in which:

FIGS. 1A–1H are schematic representations of various geometric surface forms that must be considered in the decomposition of a wide range of surfaces.

FIGS. 1A', 1B', 1C', 1G' and 1H' are schematic representations of decomposition products of the forms shown respectively in FIGS. 1A, 1B, 1C, 1G and 1H in accordance with the invention.

FIGS. 1A" and 1H" are schematic representations of decomposition products of the forms shown respectively in FIGS. 1A, and 1H in accordance with the invention.

FIG. 45B is a schematic illustration of a non-linear extrusion which has been extricated from the non-linear volume shown in FIG. 45a.

FIG. 47D illustrates a non-linear extrusion consisting of two 5 sided extrusions 108, 110 that separate at the end point of the 5 sided extrusion cluster 100. FIG. 47E illustrates a non-linear extrusion cluster consisting of a 5 sided extrusion 112 and a 4 sided extrusion 106 separated at the end point of the end of the 5 sided extrusion cluster 104. The rest of the elements around the 5 sided cluster continue into the adjacent extrusion.

FIGS. 60A, 60B, 60C, 60D, 60E, 60F, 60G, and 60H are collectively sequential parts of a single flow chart showing the decomposition of a surface with the method in accordance with the invention.

FIGS. 61A, 61B, 61C, 61D, 61E, 61F, 61G, 61H and 61I are collectively sequential parts of a single flow chart showing the decomposition of a volume with the method in accordance with the invention.

DESCRIPTION OF THE PREFERRED EMBODIMENT

Figure 60A:
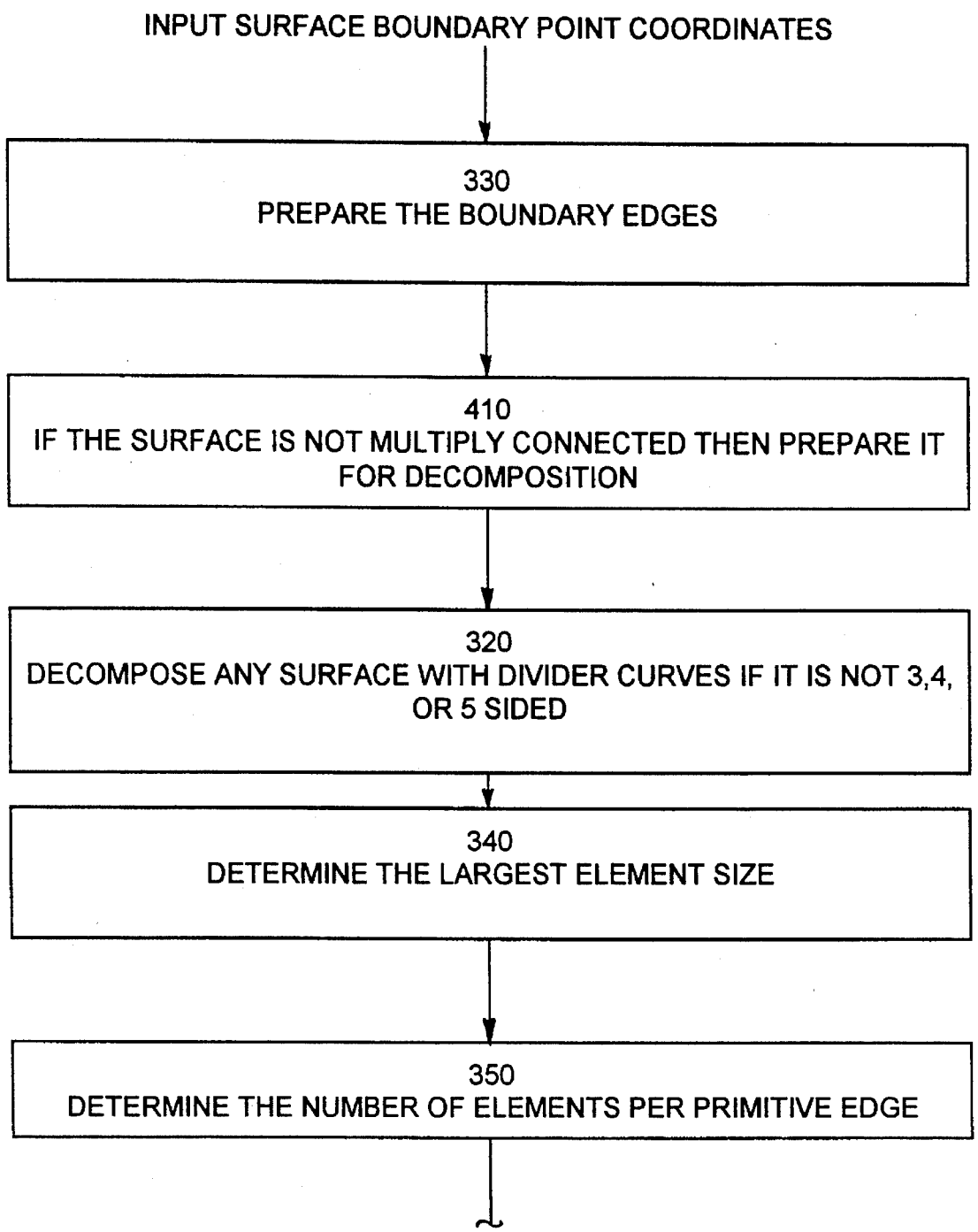
Figure 60D:
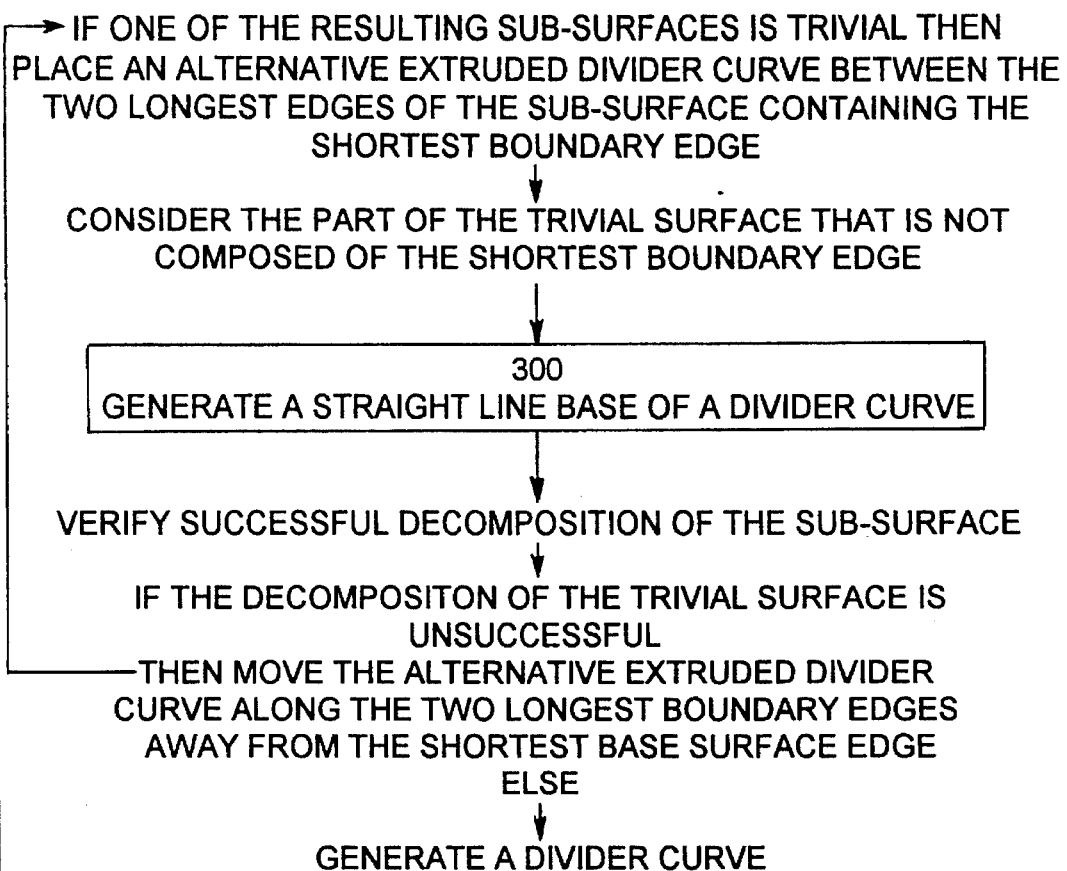
Figure 60D:
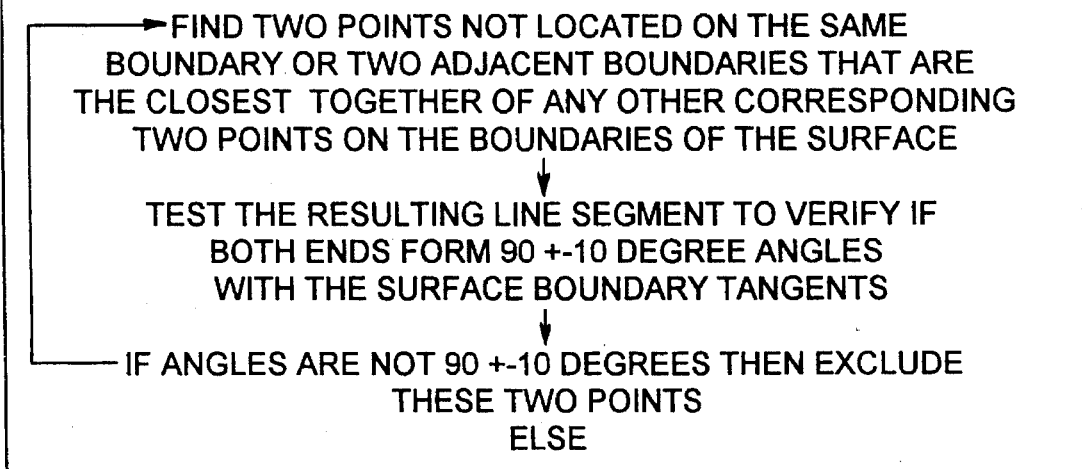
Figure 6O:
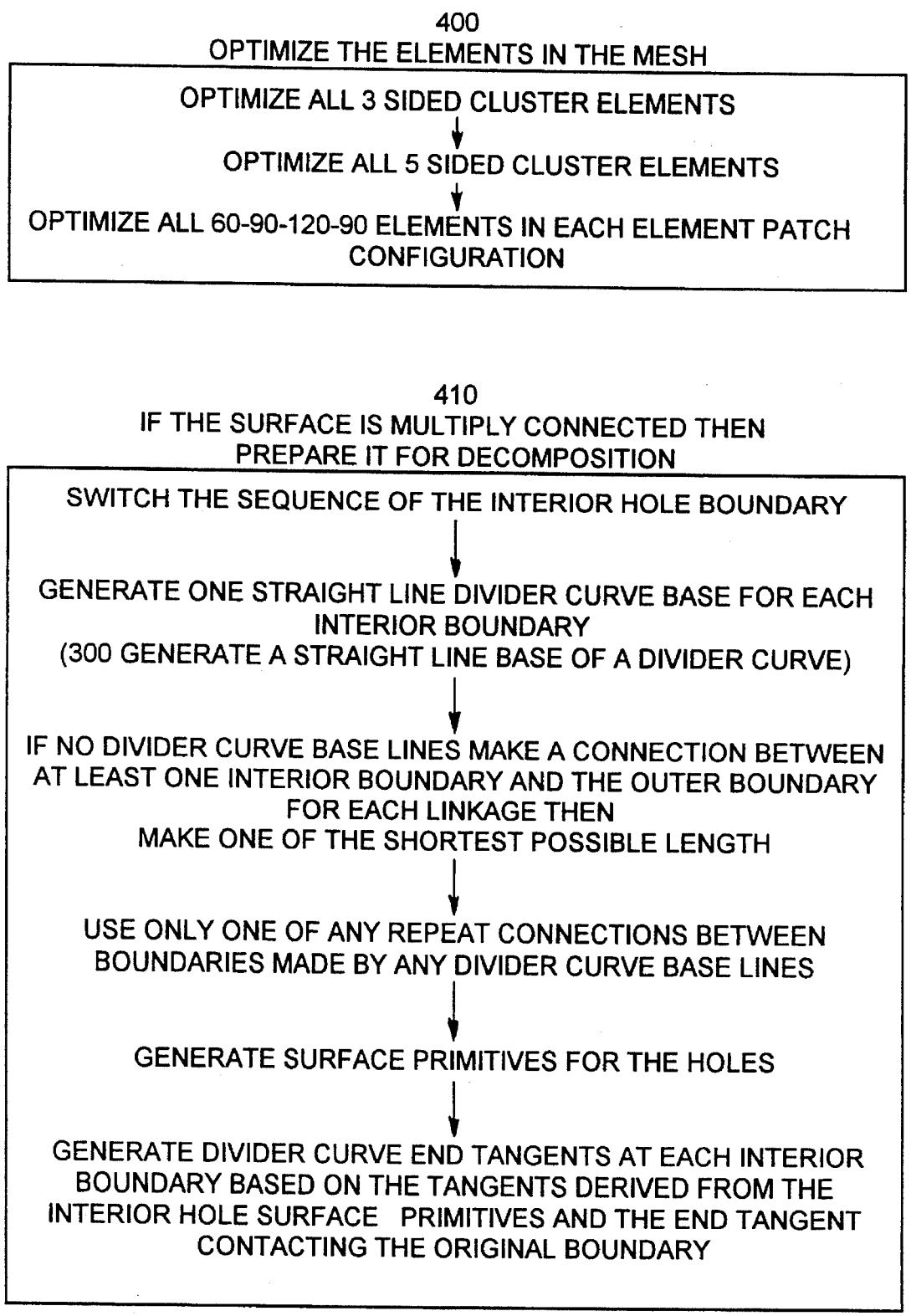
Figure 61D:
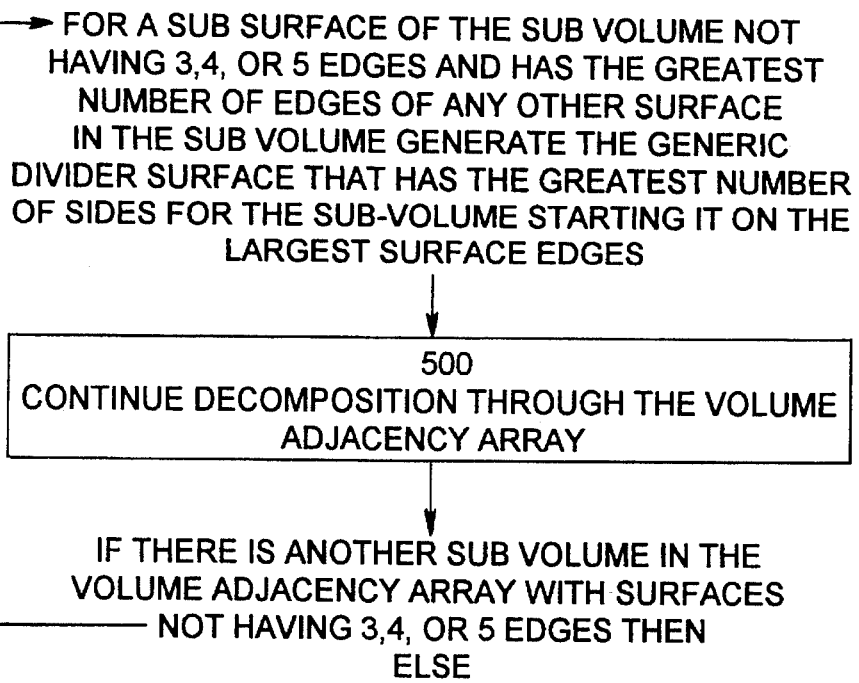
Figure 61D:
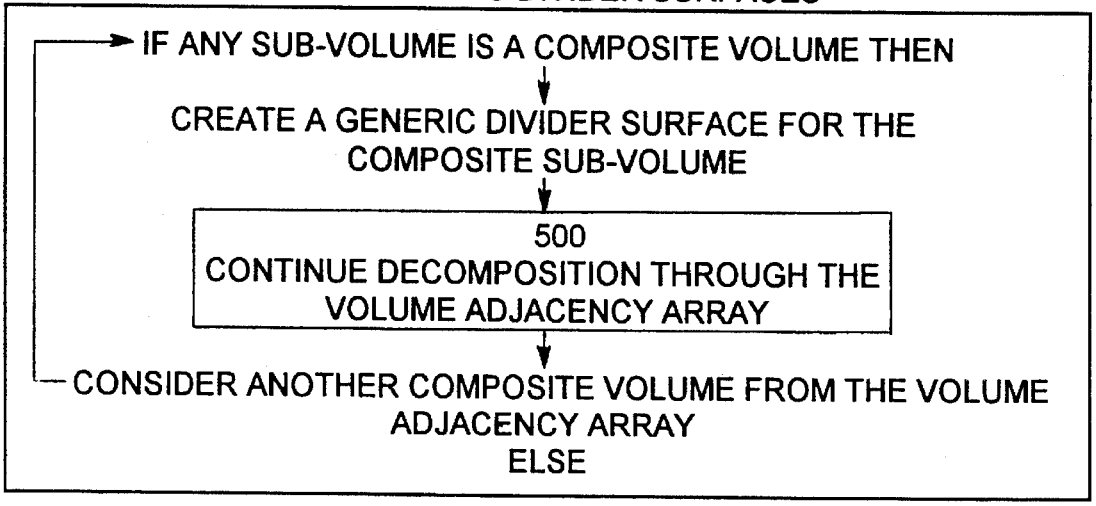
Figure 61E:
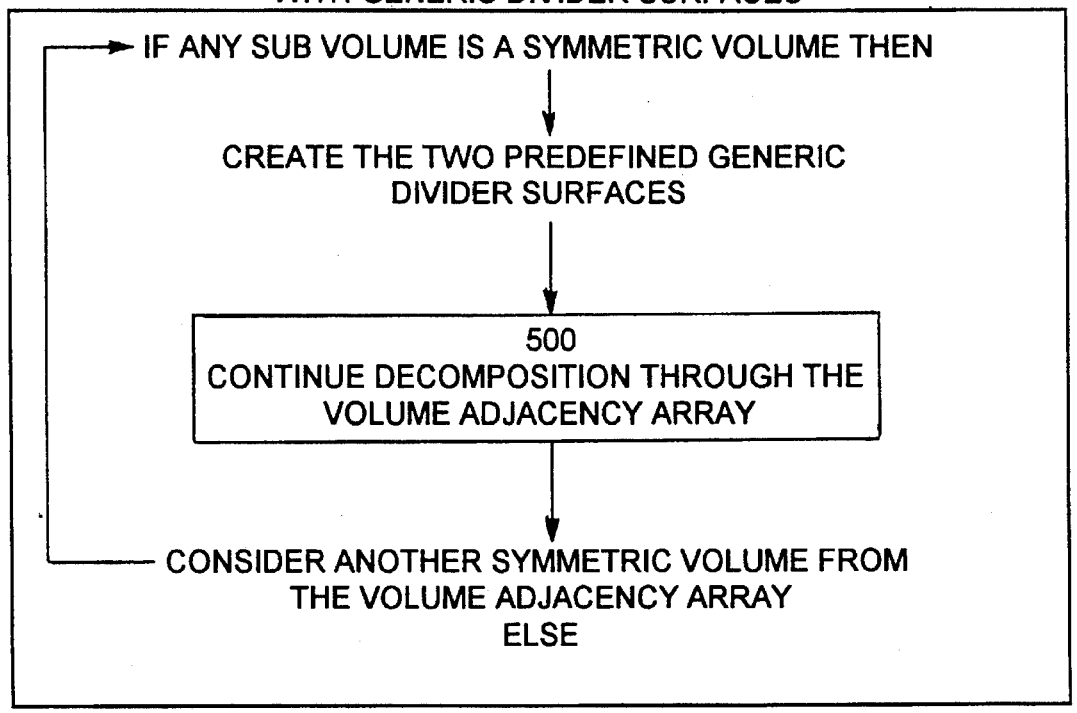
Figure 61G:
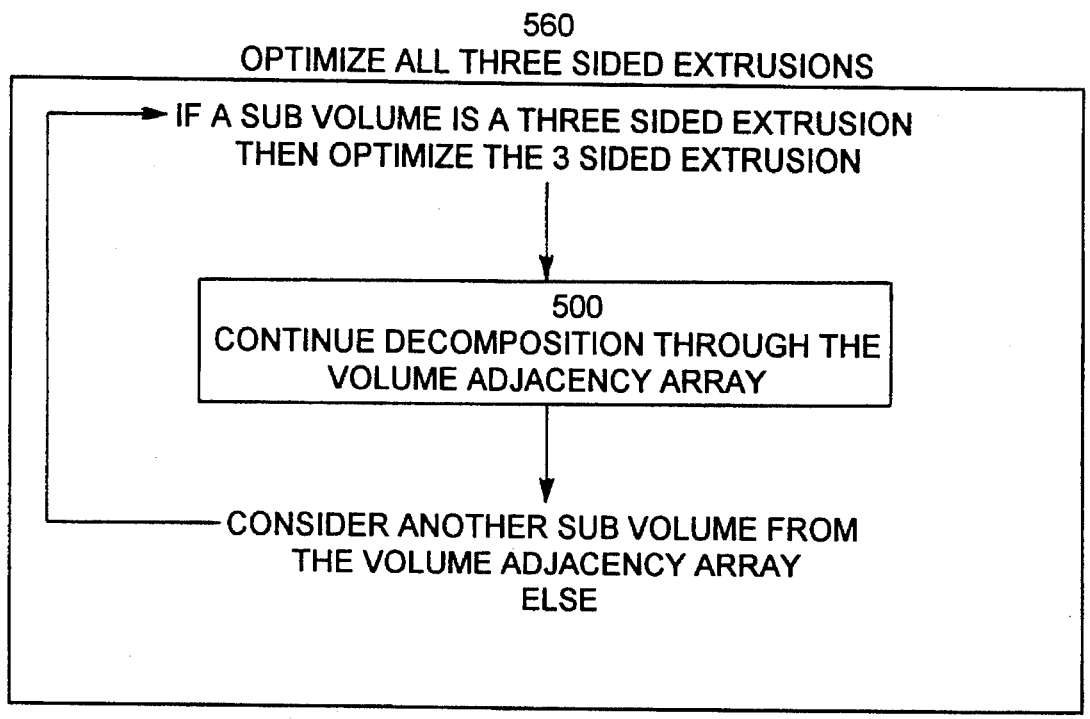
Figure 61G:
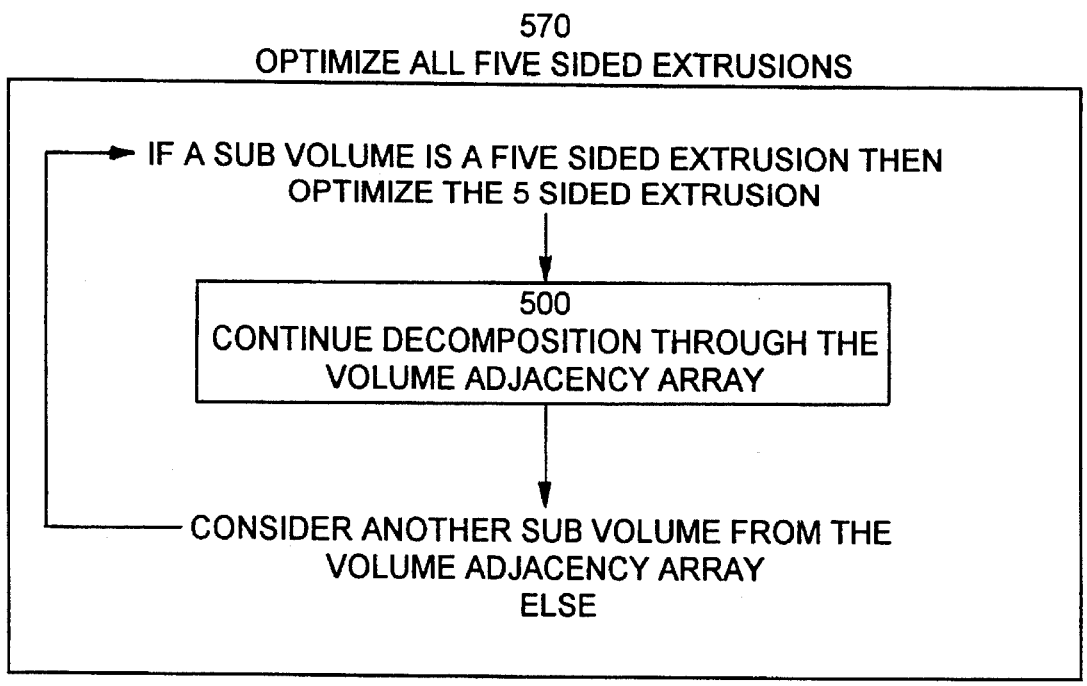
Figure 62:
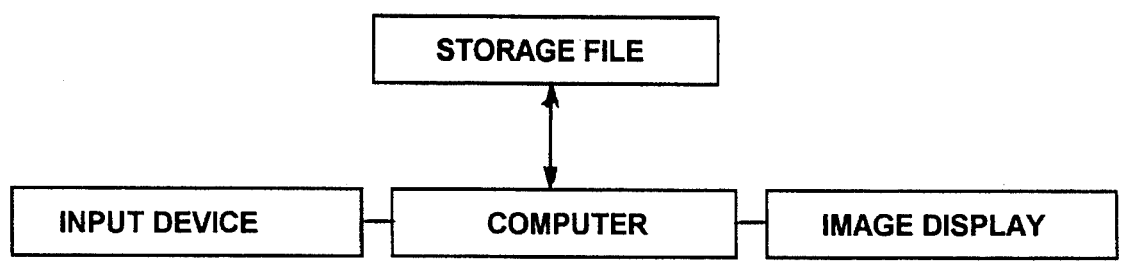
FIG. 62 is a schematic block diagram of a computer system in which the method or process of the present invention is implemented.

Referring now to FIGS. 60–61 there are shown flow charts of the finite element generation method in accordance with the invention for respectively surface and volume decomposition. As used herein and as a term of the art, the term "hexahedron" is a six sided element where all the sides are substantially quadrilaterals. It would be ideal if all the elements were cubes but this is not possible in real world situations. It will be understood that a "quadrilateral" as used herein is a figure having four essentially straight sides, each of which intersects each of two adjacent sides in points called vertices, but fails to intersects the opposite sides. As used herein one element is more "equilateral" than another if the sides or edges are more nearly equal in length. As used herein one element is more "orthogonal" than another if the sides or edges are more nearly disposed at right angle at all four vertices.

It will also be understood that in the field of finite element analysis that an orthogonal coordinate system is necessary for defining local coordinates as a base for a finite element method. Parametric transforms can convert three dimensional space into a surface in two dimensional space that may not be truly flat. All surfaces have the potential to be parametrically transformed into sections of a local orthogonal coordinate system.

The description will sequentially deal with surface decomposition and volume decomposition.

SURFACE DECOMPOSITION

The finite element method consists of three main phases: preprocessing, analysis, and post processing. The invention relates to the preprocessing stage. That stage essentially involves decomposing or defining the elements that collectively constitute a continuum. A continuum is a surface or volume that is defined by boundaries.

The preprocessing phase includes a number of sub-categories. All play an active role in the development of the data used in a finite element analysis of a continuum to which a set of boundary conditions are applied. The sub-categories are based on the techniques used to define a continuum, decomposition of the continuum into finite elements, and the application of boundary conditions. A generic representation of the boundaries defining a continuum is defined by defining edge points on a surface. Applying boundary conditions to a continuum is augmented by commonly used computer graphics techniques. There is nothing inherently difficult with defining a continuum boundary with points or applying boundary conditions to an existing finite element mesh. However, decomposing a surface into the optimum finite element mesh is based on a process that incorporates rules developed to avoid any mathematical limitations that may be encountered due to surface characteristics that are not equilateral. The ensuing process is highly sophisticated.

A surface decomposition process must be able to develop a finite element mesh based on a specified element size and provide the user with the largest element size that is compatible with a particular surface. The largest possible element size for a given surface is a starting point for testing convergent solutions by incrementally decreasing the element size to refine the mesh. A finite element mesh must contain individual finite elements that are shaped as close to a square as possible. This is a delicate situation because not all surfaces are squares or composed entirely of square sections. It then becomes necessary to define a surface in sections that are equilateral enough so that an optimum finite element mesh can be mapped onto it.

Surfaces are sequentially defined starting with a surface having one side with no corners and extending to surfaces with infinite sides. The surface in the series having four sides such as that shown in FIG. 1E has the greatest potential for being orthogonal and equilateral. This is because it can take on the form of a perfect planar square which in that case would be perfectly orthogonal and equilateral. The act of decomposing a surface into sub-surfaces that have orthogonal and equilateral properties can be thought of as starting from either end of the series as shown in FIGS. 1A–1H and approaching surface shown in FIG. 1E as far as the number of sides and corners are concerned. Once a surface has been decomposed into 3, 4, or 5 sided sub-surfaces a special process is used to partition the surface into the greatest sectional areas that can be defined by 4 sided surfaces (elements) resulting in the most equilateral representation possible.

Once a surface has been decomposed into sub-surfaces, finite elements are mapped into each. This part of the process develops a mesh specific to each sub-surface that has an even number of elements placed along each edge based on the length of each edge and the element size. Each common sub-surface has common edges with a similar number of elements along each. This means that the common sub-surface sides can be matched and the finite element mesh combined into one mesh.

The surface decomposition process is based on the assumption that there are many surface configurations that can be portrayed as equilateral. This assumption includes the assumption that a surface must be decomposed by starting with simple curves that are cubic bezier curves to partition the surface into sub-surfaces. Thereafter the bezier curves are converted into cubic interpolation polynomials. The result may not be what another person had in mind simply because there is no mathematical definition of what an arbitrary surface should look like that is not originally orthogonal. A solution to this problem would be to use state of the art computer graphics that could be employed to fine tune the contours of a structure produced by this surface decomposition process.

PROCESS

Surface Decomposition

Surface decomposition is the part of the process that breaks up a surface into sub-surfaces that are more orthogonal and equilateral than the starting surface.

Figure 2:
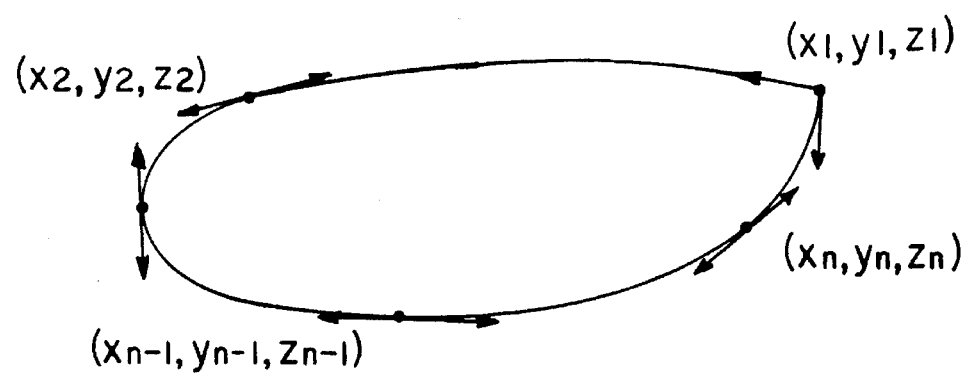
FIG. 2 is a schematic representation of a boundary defined in terms of pieced geometrically smooth cubic interpolation polynomials (bezier curves).

Surfaces are defined by boundaries made up of edges defined by points that have (x,y,z) coordinates as shown in FIG. 2. The edges are bezier curves generated in between the original points followed by conversion into pieced geometrically smooth cubic interpolation polynomials. All corners must have local tangents which form approximately 90 degree interior angles. Any corner that forms an obtuse interior angle must be represented by a radius.

Figure 3:
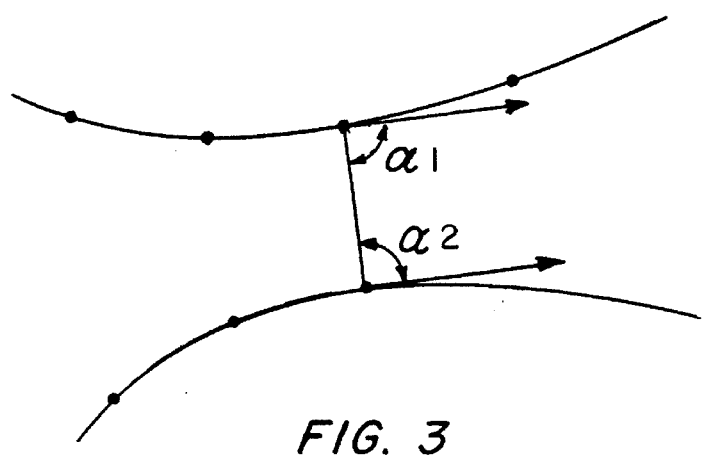
FIG. 3 is a detailed schematic representation of the shortest straight lines connecting two curves where the angle alpha1 equals 90 degrees plus or minus a tolerance angle (dangle) and angle alpha2 equals 90 degrees plus or minus a tolerance angle (dangle).

Each curve polynomial on the surface boundary is broken down into a set of points with the corresponding curve tangents located at each point. Surface decomposition is initiated starting with a base surface by finding the shortest straight line that connects to separate points and forms angles with each curve tangent that are 90 degrees plus or minus 10 degrees also referred to herein as dangle and which is shown in FIG. 3.

Figure 4:
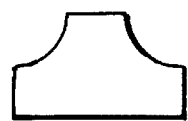
FIG. 4, 4A, and 4A' are schematic representations respectively of a base or initial surface having N sides, two sub-surfaces having N–1 sides and a trivial sub-surface having N sides and illustrates sub-surfaces that approach a 3, 4, or 5 sided sub-surfaces and trivial sub-surfaces where one of the sub-surfaces is topologically identical to the base surface. It will be understood that in the context of surfaces (two dimensional) the term "side" as used herein refers to the number of separate lines defining the surface.
Figure 4A:
Figure 4A:

It is possible that a case may arise where a surface cannot be decomposed using this technique. Two scenarios may result from an attempt at surface decomposition. The first is a successful decomposition that results in sub-surfaces that are either 3, 4, or 5 sided or at least results in sub-surfaces as shown in FIGS. 4–4A' that are or begin to approach 3, 4, or 5 sided surfaces unlike the original base surface. The second possibility is the production of trivial sub-surfaces as shown in FIG. 4A'.

Figure 5:
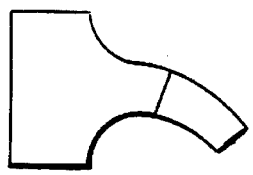
FIGS. 5 and 5A are schematic representations respectively of an elongation in a surface and the decomposition thereof which results in a trivial sub-surface.
Figure 5A:
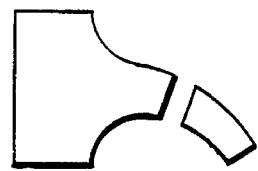

Trivial sub-surfaces may be produced as the result of two circumstances. Either there is another straight line longer than the one chosen that connects other edges of the base surface resulting in the decomposition of the surface, as illustrated in FIG. 4A, or the base surface has an elongation as illustrated in FIG. 5, FIG. 5A. In the case illustrated in FIG. 4A' testing for an elongation is necessary in order to ensure that no straight line used in a seemingly successful decomposition leaves the intended surface.

Figure 6A:
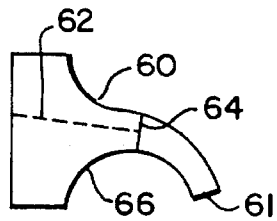
FIGS. 6A, 6B, and 6C are schematic representations of alternative extruded divider curves at three successive positions along an elongation to permit testing each position to determine if there is an adequate basis for further decomposition that results in sub-surfaces. As used herein the term "elongation" refers in the context of a two dimensional surface to a surface that is not equilateral but can be decomposed into orthogonal equilateral sub-surfaces.

Elongations can be tested by using a procedure that creates a foundation for a second try at the decomposition of a surface. FIG. 6A includes a dashed line 62 representing part of a proposed divider curve. This dashed line 62 is not satisfactory as part of a decomposition because it is not within the tolerance limitations of the present method. More specifically, the dashed line 62 is disposed at an angle with respect to the decomposition test edge 64 of the generally rectangular surface 61. Those skilled in the art will understand that although a generally rectangular surface 66 is the trivial surface in FIG. 6A that other trivial surfaces will be produced with other original sub-surfaces.

In the method according to the invention the decomposition of an elongation starts with the shortest base surface edge 61 that is adjacent to the two longest boundary edges 60, 66. More specifically, the decomposition edge 64 is sequentially moved or "pushed" from the base surface edge of the of the elongation. It will be understood that the base surface edge is the right end in FIGS. 6A–6C. The procedure in accordance with the invention sequentially moves the line segment 64 spanning both longer edges stopping to successive positions to try other possible decompositions as shown in FIGS. 6A–6C.

Figure 6B:
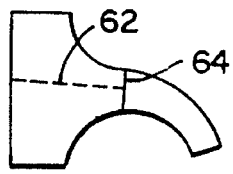
Figure 6C:
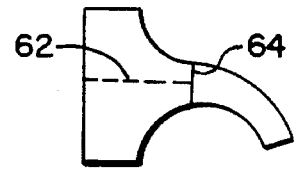

As shown in FIG. 6B the line segment 64' has been moved still further from the base surface edge of the elongation. This decomposition is also not satisfactory because the angle limitations are again not satisfied. Still further movement of line segment 64 to the position indicated by the line FIG. 64" results in a decomposition that does meet the angular limitations.

The straight line spanning each longer boundary edge is started at the shortest base edge and is extended out along each longer boundary and then situated by pushing only one straight line end point along the corresponding edge in the direction of the corresponding obtuse angle until approximately equivalent angles are formed between the line and the boundary tangents. At each interval a surface decomposition is carried out excluding the newly created trivial sub-surface. This process is continued until the base surface is decomposed into sub-surfaces. The straight line being "pushed" or moved to successive positions using a iterative process along the original surface boundaries until a successful decomposition takes place as shown in FIGS. 6A–6C.

Divider Curves

There are three different ways for producing a divider curve. These are respectively illustrated in FIGS. 7, 8, and 9. The three ways are dependent on the type of curves at the end points of the divider curve.

Figure 7:
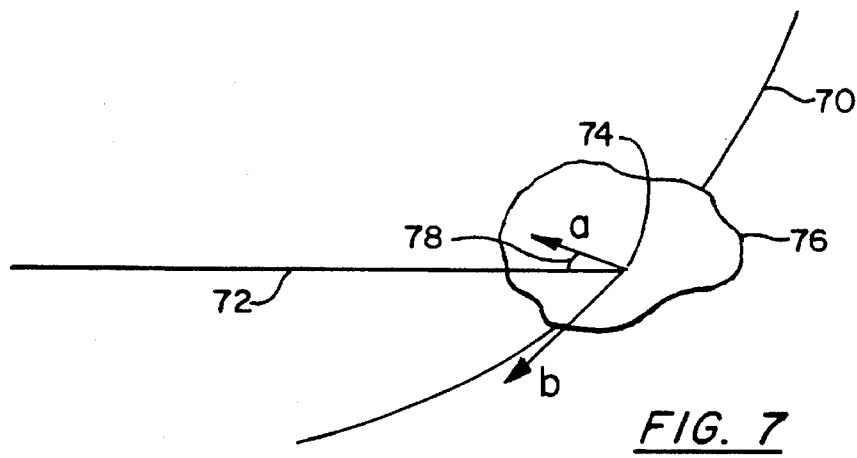
FIG. 7 is a schematic representation of a divider curve end tangent construction at an original boundary edge where vector a forms the smallest angle 78 between the plane 76 defined by the tangent of the curve 70 vector b and the straight line 72 located at a common point. The term "original boundary edge" as used herein will be understood to refer to an edge or section of an original edge of the original surface or volume before any decomposition has taken place.
Figure 8:
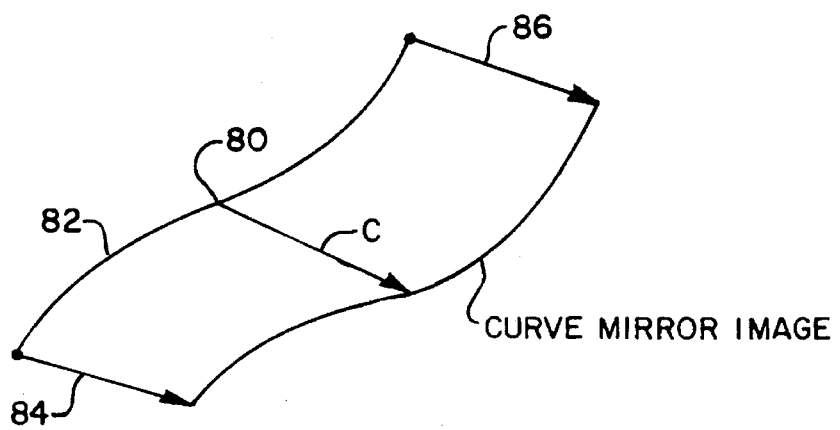
FIG. 8 is a schematic representation of an interpolated tangent c which is based on boundary tangents 84, 86 which are perpendicular to a divider curve 82 and the curve mirror image (cubic interpolation polynomial) that is generated on the tips of the boundary tangents 84, 86.

It will be understood that FIG. 7 is a schematic representation of a divider curve end tangent construction at an original boundary edge. FIG. 8 is a schematic representation of an interpolated tangent which is based on boundary tangents which are perpendicular to a divider curve and the curve mirror image (cubic interpolation polynomial) that is generated on the tips of the boundary tangents.

Figure 9:
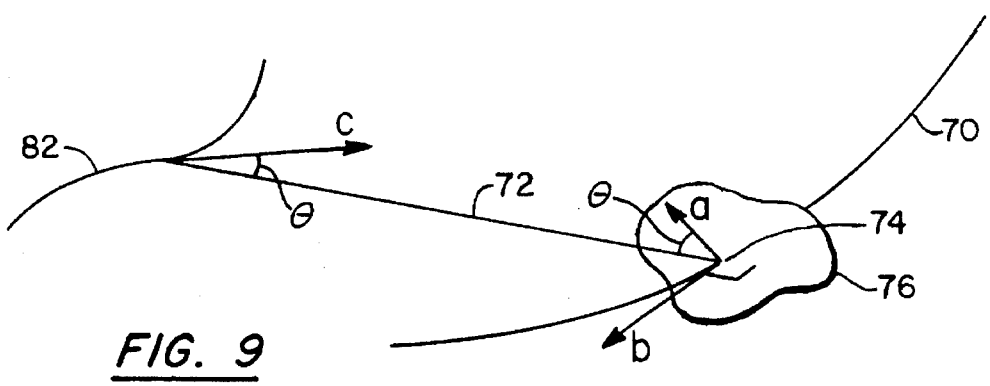
FIG. 9 is a schematic representation combining the results of FIGS. 8 and 7 showing an interpolated tangent c, an angle theta between the interpolated tangent c and a straight line 72 on the left side of the drawing and on the right side of the drawing a boundary tangent vector b and a straight line unit vector a dotted into the plane defined by a boundary tangent vector b, forming the smaller of two angles between the straight line unit vector 72 dotted into the plane defined by vector b forming an angle between a and the straight line 72 thus where the resulting angle is made to equal the left side angle theta by manipulating the dot product.

FIG. 9 is a schematic representation combining the results of FIGS. 8 and 7 showing an interpolated tangent, an angle theta between the interpolated tangent and a straight line on the left side of the drawing and on the right side of the drawing a boundary tangent vector and a straight line unit vector dotted into the plane defined by a boundary tangent vector, forming the smaller of two angles between the straight line unit vector dotted into the plane defined by vector b forming an angle between vector a and the straight line thus eliminating any other dot product where the resulting angle is made to equal the left side angle theta by manipulating the dot product.

In the first case, as shown in FIG. 7, the original boundary curve 70 is located at the divider curve 72 end point 74. In this example the divider curve 70 is a straight line segment and the divider curve will have a second original boundary curve at the other endpoint thereof. For simplicity this has been omitted from FIG. 7. A straight line unit vector a is projected into an end plane 76 defined by a boundary tangent vector b. A smooth bezier curve is then generated from the end tangents and that curve is then converted to a cubic interpolation polynomial. The direction of the unit vector a may have to be negated at the end point 74 so that the shortest curve is produced.

The second case as shown in FIG. 8 does not involve an original boundary curve. Instead it involves a previously generated divider curve 82. In this case the boundary edge passes through an endpoint 80 which is a point on a previously constructed divider curve 82. The process in accordance with the invention then constructs boundary tangents 84, 86 at the end points of the divider curve 82. A divider curve (not shown) end tangent is interpolated from the boundary tangents 84, 86 of the previously constructed divider curve 82. The divider curve tangents c (one shown) are tested for the correct direction by dotting it with the unit vector of the straight line starting at the current endpoint, resulting in the smallest dot product if the direction is adequate. Vector c is an interpolated tangent.

The third case, shown in FIG. 9, occurs when the boundary edges are respectively an original boundary edge and a previously constructed divider curve. Thus, reference numerals shown in FIGS. 7 and 8 are used to represent like parts. In the process in accordance with the invention the angle between vector a and the straight line 72, identified as theta, is equal to the angle identified as theta between vector c and straight line 72. More particularly this geometric relationship will be established by manipulation of the dot product.

This concludes the presentation of the steps that are required for a single decomposition of a surface. Repetition of this process may be necessary until all of the surfaces that result are 3, 4 and 5 sided. These three surface types are called primitives and are desirable because they can be defined using state of the art surface interpolation polynomials.

Primitives

Figure 10:
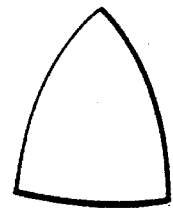
FIG. 10 is a schematic representation of a 3 sided primitive.
Figure 11:
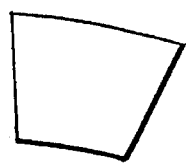
FIG. 11 is a schematic representation of a 4 sided primitive.
Figure 12:
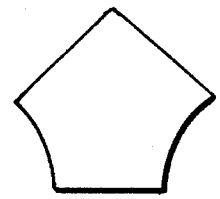
FIG. 12 is a schematic representation of a 5 sided primitive.

Primitives are surfaces that if decomposed will result in trivial sub-surfaces. There are three primitives that have 3, 4, and 5 sides shown in FIGS. 10, 11, and 12. The most orthogonal and therefore easiest to define, is the 4 sided primitive. The 3 sided primitive can be considered to be a 4 sided primitive having a side length equal to zero. Because of this a 3 sided primitive has the same basic orthogonal qualities as a 4 sided primitive. The 5 sided primitive is treated like a 4 sided primitive that has a point representing a corner located on one of its edges. The 3 and 5 sided primitives lose some degree of orthogonality because of the modifications that make each more easily defined using the 4 sided primitive.

Adjusting Divider Curves

Figure 13:
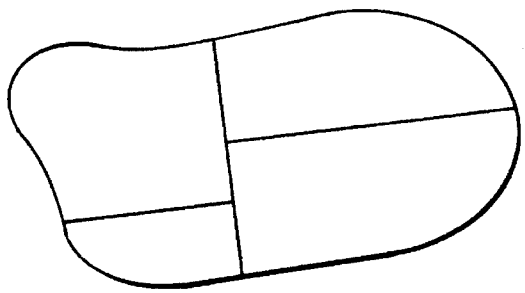
FIG. 13 is a schematic representation of a decomposed surface after the divider curves are adjusted so that each curve contacts a previous divider curve at an even element vertex.

At this point in the final stages of the decomposition process sub-surfaces have been defined to exist only in the form of a collection of 3, 4, and/or 5 sided primitives. The divider curves that begin or end at other previously generated divider curves must have the positions readjusted so that the finite element meshes that are developed will fit together as one integral mesh. This is started by determining the largest possible element size for the mesh by dividing the smallest edge of any of the existing primitives by 4. Each primitive edge length is then divided by the element size with the result rounded off to the nearest even number. This results in the number of elements corresponding to each primitive edge. Starting from the last divider curve made that has an end point located on another divider curve, reposition that divider curve endpoint so that it is located at an even element vertex position on the other divider curve as shown in FIG. 13.

This process may seem to be redundant and that this should have been done somehow while the surface was being decomposed. However it is not known until the decomposition process is complete what physical configuration the divider curves will have. Therefore it is quite necessary to wait until surface decomposition has been completed before the position of the divider curves can be adjusted.

Optimization of a 5 Sided Primitive

Five sided primitives can be defined in terms of an optimized 5 sided sub-surface and surrounding 4 sided sub-surfaces that absorb most of the distortion in the original 5 sided primitive. The optimum shape for a 5 sided primitive is a surface that has approximately equivalent edge lengths.

Figure 14:
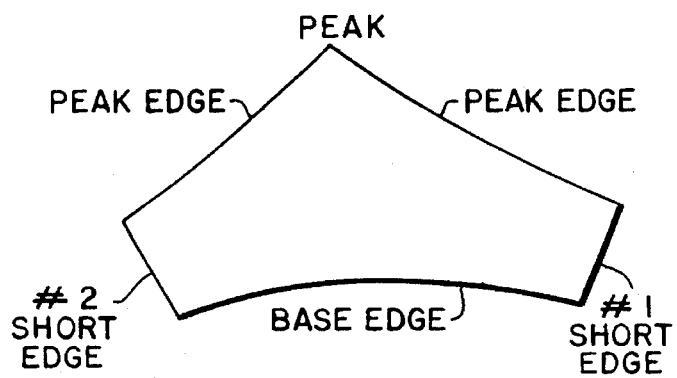
FIG. 14 is a schematic representation of a 5 sided primitive prior to optimization including labels to better identify the terminology associated with the sides thereof.

A 5 sided primitive is characterized in terms of the lengths of each edge. There is always a combination of two edges common to the longest base edge that are relatively short in length. The rest of the primitive can be classified as a peak which is a vertex of two peak edges as shown in FIG. 14.

There are two separate procedures that are used for decomposing a 5 sided primitive. The procedure that is applicable can be found by applying a simple test. The first procedure is used if one of the two peak edges has a length less than half of the base length. If both peak edge lengths are longer than half of the base length then the second procedure is used.

Figure 15A:
FIGS. 15A–15C are schematic representations of possible configurations of 5 sided primitives and possible surface absorption results with optimized 5 sided primitives and absorption primitives.

If the first procedure is implemented then the shortest peak edge and shortest side is used in the initial definition of the new 5 sided primitive. By extending the length of the shorter peak edge down the other peak edge starting from the peak vertex and extending the same length along the base edge starting from the vertex formed with the shorter edge adjacent to the shortest peak two points can be defined. These two points can be adjusted so that each is positioned so that an equivalent even number of elements exists along the two peak edges of the remaining five sided primitives and the edge that lies on the original base edge as shown in FIG. 15A. A divider curve is then constructed between the two points and is assigned the same number of elements as on the shortest edge adjacent to the shortest peak edge used to construct the new optimum 5 sided primitive. The divider curve is constructed with the same methods of this process.

Figure 15B:
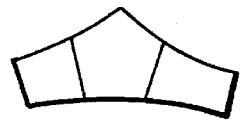
Figure 15C:
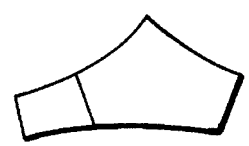

The 5 sided primitive produced by this procedure may not have the same number of elements on each edge. A second divider curve can be placed on some even element vertices of the 5 sided primitive creating an additional absorption primitive that would take up the excess elements as shown in FIG. 15C thereby creating an optimum 5 sided primitive with approximately the same number of elements on each edge.

The second procedure takes the average of the left over lengths left over from the difference between each peak edge minus half of the base length placing on each peak edge at twice the resulting average distance extended from the peak two points. Another two points separated by the same length, centered at the midpoint of the base curve are placed on the base curve. These points are adjusted to lie on even element vertices and have the same number of elements on each edge. Divider curves are constructed and the new edges assigned the same number of elements as on the other 3 edges. The divider curves are constructed with the same methods of the process shown in FIG. 15B.

Clusters

Figure 16:
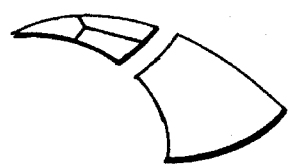
FIG. 16 is a schematic representation of a 3 sided primitive element cluster placement resulting in a single patch.
Figure 17:
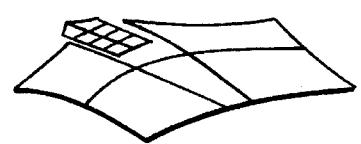
FIG. 17 is a schematic representation of a 5 sided primitive element cluster placement resulting in a multiple patch.

Clusters are pre-existing element configurations that are mapped into 3 and 5 sided primitives. The area of the primitive covered can be only a fraction of the whole sometimes resulting in an empty section that can be described in terms of one or more 4 sided primitives. The 3 sided primitive has a 3 element cluster mapped into the vertex of the two longer edges as shown in FIG. 16 and the 5 sided primitive has a 5 sided cluster mapped into one of the primitive boundary corners as shown in FIG. 17. Both clusters are outlined by cubic interpolation polynomials that are simultaneously mapped into place with the mesh. These are used as the basis for separating the 3 and 5 sided clusters coverage area from the rest of the primitive so that it can be covered by 4 sided primitives. The placement of a three sided cluster in a 3 sided primitive results in one 4 sided primitive shown in FIG. 16. In the case of a 5 sided primitive there are five 4 sided primitives which are defined by either the cluster edges, the original primitive edges, or newly constructed divider curves all starting at either of the two cluster corners.

The curves are generated with the method used when one boundary is an original and the other is a previously constructed divider curve. The 4 sided primitive edges adjacent to and opposite to the cluster edges have an equivalent number of elements. The edges not already defining the 4 sided primitives are defined with divider curves generated using the method employed when the endpoints connect original boundaries. In the case of the 5 sided primitive the 4 sided primitives adjacent to the cluster have the same number of elements on the matching side and opposite side of the primitive as shown in FIG. 17.

Figure 18:
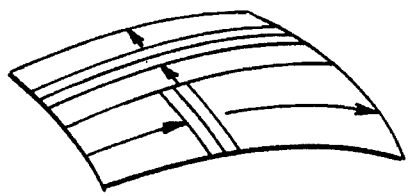
FIG. 18 is a schematic representation of patch halves containing layers placed in perpendicular directions along opposing curvilinear axes in each patch half.

At this point the surface consists as a skeleton of cubic interpolation polynomials that break the surface up into primitives that if 3 or 5 sided contain an element cluster. This results in a web of 4 sided primitives called patches. Each side of a patch has an even number of elements associated with it. It is likely that there may be a difference in the number of elements along opposing sides. This requires a process that can create a 4 sided mesh with a varying number of elements along each side. The process used to develop a finite element mesh for each of the patches is the workhorse that is utilized in the final stage of decomposing empty 4 sided primitives into finite elements. A patch is split into two halves. Only 2 opposing edges of a patch half can have an unmatched number of elements and only one of the patch halves has an edge that is common with the other half where that edge is one of the opposing edges that vary in the number of elements. As a result each patch has two axis running perpendicular to each other. The number of elements varies from one edge to the other along this axis as shown in FIG. 18. Since patch halves have only one direction that the number of elements differs through, layers of elements are used to fill the patch half along the patch half axis. Layers are 2 elements thick and are comparable to mini 4 sided primitives. The layers of a 4 sided primitive can be listed in the order of the greatest difference between layer edge lengths. Layers can only have an element increase across opposing edges by an even integer.

The reason this is done is so that the element configurations used to increase the number of elements from one edge to the next can be placed in the layers best suited to result in a smooth well formed surface mesh.

Figure 19:
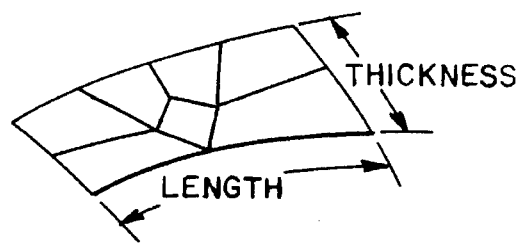
FIG. 19 is a schematic representation of an element patch configuration used to increase the number of elements from one side of a layer to the other.
Figure 20:
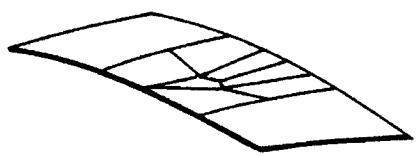
FIG. 20 is a schematic representation of an element patch configuration mapped into a layer.

Increasing the number of elements from one edge to another edge of a layer requires the implementation of an element patch configuration. An element patch configuration contains the least number of elements that increases in the number of elements along two opposite edges as shown in FIG. 19. The elements are arranged in the patch so that all seven have vertex angles which are no greater than 120 degrees, no less than 60 degrees, and there is a minimum of overall distortion of the elements. These elements are marked for optimization during the mapping process after completion of the mesh. In order to facilitate this, patch(es) are always mapped as close to the center of a layer as possible as shown in FIG. 20.

Filler Elements

Figure 21:
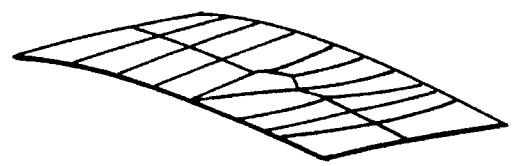
FIG. 21 is a schematic representation of finite elements mapped into the remainder of a layer about an element patch.

Filler elements are 2 by some even integer of elements in size and are mapped into all of the layers and layer sections not already filled by element patches as shown in FIG. 21.

Mesh Optimization

After the mesh is developed and consists of individually mapped finite elements each element must be combined into a whole interconnected mesh. This interconnectivity is represented by a file defining mesh connectivity and global nodes that have (x,y,z) coordinates. The process is not complete however until each element, that may have an unacceptable distortion, is reconfigured to an optimum shape.

Figure 22A:
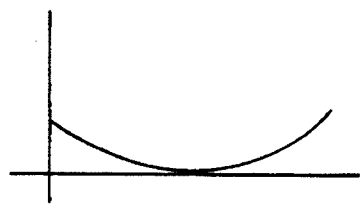
FIGS. 22A is a parametric representation of a cubic narrowing function.
Figure 22B:
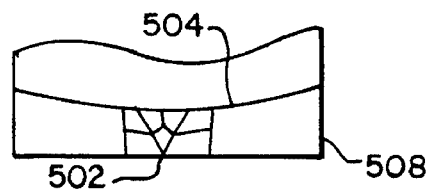
FIGS. 22B is an ideal representation of the results of applying a cubic narrowing function to an exterior element layer.
Figure 22C:
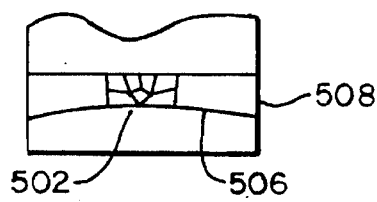
FIGS. 22C is an ideal representation of the results of applying a cubic narrowing function to an interior element layer.

The three central elements for a 5 sided cluster, the 3 elements of a 3 sided cluster, and the element patch configurations used in the layers must all be labeled during the decomposition process so that each separate element can be reoriented at a later time in order to maintain the optimum mesh. Optimizing element patch configurations requires that an element row be narrowed or widened so that any 120–90–60–90 degree elements existing in the row can be optimized with a combined result of creating an optimum element shape for the element patch configuration. The narrowing function as shown in FIG. 22A is linear, is based on two geometrically smooth cubic interpolation polynomials, and is mapped into place on the surface using an original row and its corresponding edge as a neutral axis. The bottom edge of a layer 508 shown in FIGS. 22B–22C is used as the neutral axis of layers that have a bottom edge existing in the interior of the surface 506 shown in FIG. 22C. The top edge is used for layers that lie along the outer surface edge 504 shown in FIG. 22B. The magnitude of the narrowing function is equivalent to the distance required to make the element patch configuration 502 have a thickness/length ratio 1:2 as shown in FIG. 22.

Figure 23A:
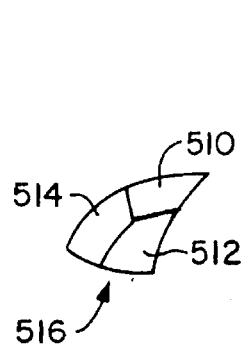
FIGS. 23A–23A' and 23B–23B' are schematic representations respectively of two sets of possible element clusters that have distortion sensitive elements illustrating results of reshaping both 3 and 5 sided element clusters.
Figure 23A:
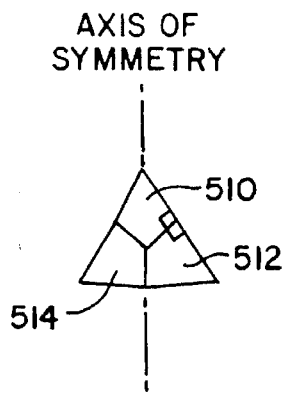
Figure 23B:
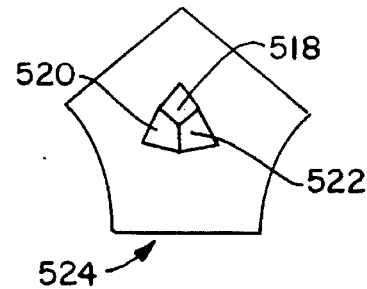
Figure 23B:
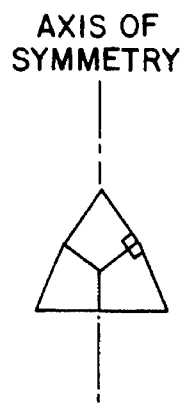

Referring now to FIGS. 23A and 23B, the three elements 510, 512, 514 collectively form a 3 sided cluster at the top of the triangular surface 516 and the 3 central elements 518, 520, 522 are located at the center of the 5 sided cluster 524 are reoriented with respect to an average plane obtained from the element vertices. This is done prior to an optimization of an element patch configuration in every case.

Figure 24A:
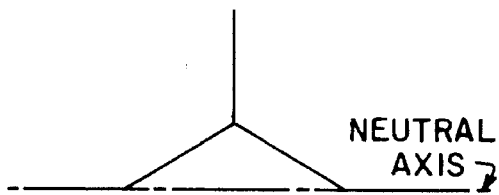
FIGS. 24A–24C are respectively schematic representations of an optimized 120, 90, 60, and 90 degree element including the resulting optimization of the surrounding patch elements that occur as a result.
Figure 24B:
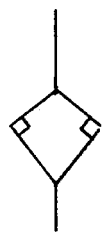
Figure 24C:
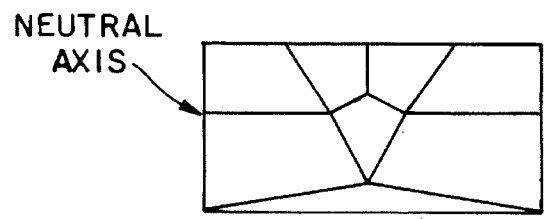

All 120–90–60–90 elements (elements having substantially these sequential interior angles) in each element patch configuration are repositioned so that each has exact 120–90–60–90 degree vertices resulting with the surrounding elements having a final shape that is optimum. The 120 degree vertex is used as the basis for extending the two adjacent element edges, fixed at 120 degrees apart, the shortest distance to the axis running through the patch center as shown in FIG. 24A. As shown in FIG. 24B, perpendiculars to the extended edges are in turn extended in the same plane as the 120 degree vertex both ending at a common intersection point. The other 6 surrounding element vertex points in common with the reshaped 120–90–60–90 degree element vertices are repositioned in accordance with the new position of the element nodes as shown in FIG. 24C.

SURFACE DECOMPOSITION PROBLEMS

Figure 25:
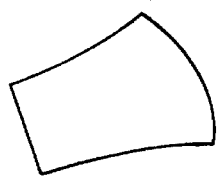
FIG. 25 is a schematic representation of a 4 sided primitive that is equilateral. As used herein one primitive is more "equilateral" than another the closer the shape or volume is to having the sides or edges are more nearly straight lines that are equal in length, are smooth and continuous, and form right angles at all four vertices.
Figure 26:
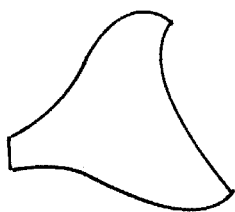
FIG. 26 is a schematic representation of a 4 sided primitive which is not orthogonal due to the loss of equilateral qualities throughout parts of the region of the primitive.
Figure 27:
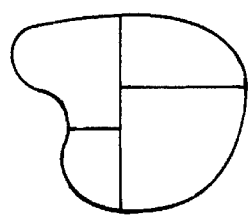
FIG. 27 is a schematic representation of a surface decomposition which does not produce a complete set of primitives having rectilinear qualities.

There are three enigmatic aspects of this process. Each can be classified differently, a governing fact, a problem, and a characteristic of surfaces. The governing fact is a function of orthogonality. In fact, orthogonality is imposed on the process because the mathematics used to represent surfaces cannot model anything but an orthogonal system. Thus the process cannot start with a surface that is configured in such a way that after decomposition will contain extremely deformed primitives. This process has no way of discriminating between a well behaved primitive as shown in FIG. 25 and a primitive that has inherent discontinuities as shown in FIGS. 26 & 27.

The biggest problem with the surface decomposition process has to do with elongations. If the boundaries making up an elongation are bumpy or excessively wavy the straight line pushed down the extension and situated so that it contacts the boundary edges at roughly a perpendicular angle is hard to position. For example if the boundary consists of short sporadic waves it is conceivable that the straight line endpoint could be placed on interval points that do not have a tangent that is perpendicular to the straight line in accordance with the allowed tolerances of divider curve placement.

The surface decomposition process produces surfaces with characteristics that may seem to be contrary to what a person may have initially envisioned. Surfaces are decomposed into primitives that are partially bounded by single cubic interpolation polynomials. Because of the fact that only one curve represents a surface or sub-surface division, there is an absence of higher order multi curvatures in the surface interior.

SURFACE DECOMPOSITION PRODUCT

The surface decomposition process produces an optimum finite element mesh composed entirely of quadrilateral elements. Quadrilateral elements are universally recognized as the best for basing an analysis on. Some systems create finite element meshes using triangular elements. This process does also because a mesh consisting of the optimum triangular elements would result from dividing elements of a mesh produced here with a diagonal. The process produces a mesh containing the largest possible element size for a given surface. By doing this an efficient basis for testing convergence is possible. Any subsequent reduction in element size would have the effect of refining the mesh.

There is a byproduct associated with this process. Each surface can be considered to be in a skeletal state prior to any finite element mapping. The interior of the surface is defined in terms of single cubic interpolation polynomials. These curves define the boundaries of equilateral primitives and can be sculpted into having a form closer to what a person would consider a better representation of the surface contours. This could be accomplished using interactive graphics and would allow a person to transform an otherwise undefined surface into an interpretation of what it would be like. The finite element mesh is defined by connectivity and nodal point coordinates. A file is created which has a listing of each element by global node numbers. Each node is listed at the end of the file with x,y,z coordinates defining its position. The file is in a text format that can be reformatted so that a separate analysis package can be used. In practice this works well and poses no limitations as to what analysis package is to be used.

VOLUME DECOMPOSITION

Volumes are decomposed into hexahedron finite elements using a process that is based on breaking up volumes in terms of generating new surfaces and sub-dividing original surfaces that define the volume. Much of the data that defines a surface is generated using the surface decomposition process. The volume decomposition process can be discussed on more general terms than in the surface decomposition process for two reasons. The first is that the volume decomposition process is based on the decomposition of the surfaces defining the volume and all of the resulting extrusions using a large number of other sub-procedures that are part of the surface decomposition process. This eliminates a lot of detail pertaining to the mathematical representation of each volume surface. The second reason is that volumes can be defined only by finite elements that have been extruded along a path of extrusion surfaces placed at evenly spaced intervals where the extrusion surfaces have a change in configuration that is proportional to the shape of the extrusion end surfaces throughout the path. Because of this limitation the type of volumes that can be meshed have certain characteristics that can define a set of what volumes can be decomposed thereby restricting the application of the process to a class of "well behaved" volumes that have surfaces with approximately equivalent edge lengths or volumes that are relatively uniform extrusions.

Volumes are defined strictly in terms of surfaces during the entire volume decomposition process. This is a unique approach differing from contemporary practice in that the result is a process which never requires a track of locus points used to define an approximate extrusion path of finite elements. The process presented here defines each volume throughout the decomposition process entirely in terms of surfaces using the same surface definition procedures of the surface decomposition process and a system of classifying a volume or sub-volume so that each type can be decomposed accordingly.

Volumes can be placed into one of four categories. Each classification is based on the number of edges corresponding to the surfaces that make up a volume. The first three categories are composite, symmetric, and non-linear. All of the volumes that are contained in these categories are made up entirely of surfaces having 3, 4, or 5 edges. A volume in one of these three categories is decomposed directly into a combination of 3, 4, or 5 sided extrusions. An extrusion is decomposed into extrusion surfaces placed at intervals along the extrusion path.

The meshes plotted on each extrusion surface must have an equivalent number of elements on each edge. This is necessary in order to have a match between adjacent extrusions throughout the volume. Any change in the number of elements on an edge must be matched by the same number of elements along an adjacent edge of another extrusion.

The fourth category consists of volumes that may have at least one surface that is not 3, 4, or 5 sided. This type of volume is decomposed into sub-volumes using a general decomposition process that is repeated until all the sub-volumes produced are made up of surfaces with 3, 4, or 5 sides. The volumes produced are either one of the three previous volume categories and are then decomposed into 3, 4, or 5 sided extrusions or already 3, 4, 5 sided extrusions.

Extrusions must contain extrusion surfaces that are relatively similar in size and shape. This limitation means that there are certain volume configurations that cannot be defined using uniform finite element extrusions. This type of volume can be characterized as having surface edges that are smooth and approximately equivalent in length for each surface or is a uniform extrusion. This may seem like a large limitation but there are many practical volume configurations and variations of such that can be automatically meshed using optimum finite elements thereby avoiding the laborious job of manually inputting each element vertex.

Figure 47A:
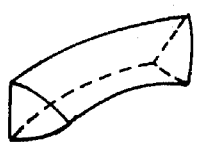
FIGS. 47A–47E are schematic representations of 5 possible extrusions that may result from the decomposition process.
Figure 47B:
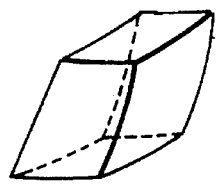
Figure 47C:
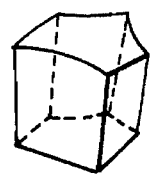
Figure 47D:
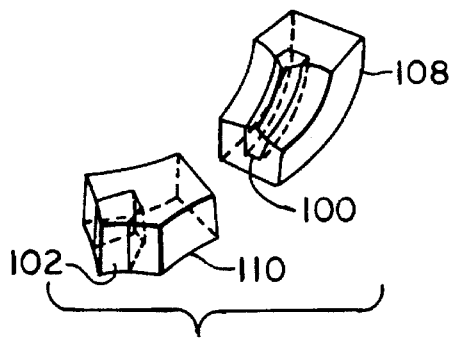
Figure 47E:
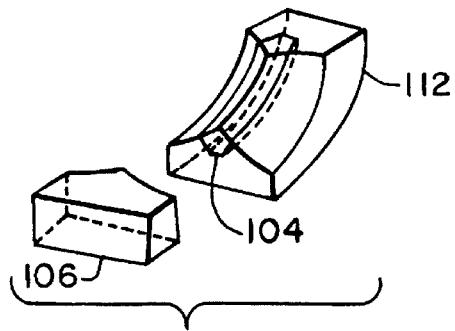

The decomposition of the composite volumes is the workhorse of the volume decomposition process. These volumes can be directly decomposed into smaller composite volumes that have fewer surfaces. After repetition of this procedure remaining composite volumes ultimately are reduced to 3, 4, and 5 extrusions. Symmetric volumes are decomposed using a more direct procedure that is predefined for each type of extrusion. This is because there is a need for the creation of two surfaces that are constructed edges placed at particular edges of each of the symmetric volumes in such a way that decomposition is guaranteed. The non-linear volumes contain one extrusion that is not a continuous extrusion. A continuous extrusion is one that extends one original surface of a volume to another original surface of the volume even though it may be disposed in a plurality of sub-volumes as part of the decomposition process. There are two non-linear volumes each containing two types of non-linear extrusions which consist either of two 5-sided extrusions 104 as shown in FIG. 47E or the side of the 5-sided extrusions 100 as shown in FIG. 47D and cannot be continued through any of these adjacent extrusions.

Finally, the limitations on the possible configurations of a volume do not hinder the use of this process as far as the development of finite element meshes for practical volume shapes is concerned.

VOLUMES

Figure 28A:
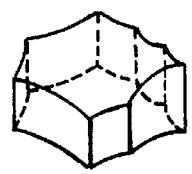
FIG. 28A and 28B are schematic representations of volumes.
Figure 28B:
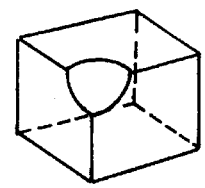

Surfaces are used to define a volume in the process in accordance with the invention. As examples, discrete surfaces define the volumes in FIGS. 28A and 28B. Each surface consists of edges made of points. For the purpose of the process the points are considered sequentially in a counterclockwise order as viewed from outside the volume. As a result of this convention all surfaces have normals pointing away from the volume interior. This convention is maintained throughout the volume decomposition process. Volume surfaces are decomposed into primitives using the surface decomposition process. The primitives are stored as data that is in the form of a web of divider curves that represent the sub-divisions of the surfaces. The primitives are easily represented using the mapping techniques of the surface decomposition process.

DIVIDER SURFACES (GENERIC)

Divider surfaces are used to decompose a volume into sub-volumes so at least one of the volume surfaces have a decrease in the number of edges by at least one. There are two types of divider surfaces, generic and real. Generic divider surfaces are defined as edges which begin and end on edges of an original or previously defined divider surface edge. After the definition of all possible divider surfaces has been made the location of each surface throughout the volume can be ascertained. Real divider surfaces are physical representations of generic divider surfaces and have a similar data structure as the original volume surfaces.

Divider surfaces are generated for any volume that has at least one surface with greater than 5 or less than 3 edges. Each decomposition carried out on a volume must produce a divider surface with as many edges as possible. Finding the largest number of edges that make the surface can be done using a tree data structure used to represent a map of all the possible loops that would subdivide the volume. The loop path is determined at a loop starting edge of the largest surface by creating new nodes for n–3 edges of the surface that are not adjacent to the starting edge or are the starting edge itself. The nodes are added to the data structure as node branches. Nodes are the representation of the generic edges that make up a divider surface consisting of a surface label with the beginning and ending edge numbers of the volume surface. All possible loops are generated starting and ending at a common edge of the volume. The tree branch having the greatest number of nodes is used as the loop of edges defining the divider surface that decomposes a volume.

Using the largest loop of edges to define a divider surface insures the decomposition does not generate an increase of surface edges on any of the sub-volume surfaces. Some volumes have a similar problem built into them so that even if each divider surface consists of the largest number of edges it is still possible for some of the surfaces to have an increase in edges when decomposed. This has to be remedied prior to the generation of generic divider surfaces by excising certain surface features from the volume with a preparatory decomposition.

Preparatory decompositions produce divider surfaces like any other volume decomposition except that the edges of the new surface are placed on prescribed edges of the original volume relative to isolated geometric surface features of the volume. This prepares the volume for decomposition using the largest possible surface edge loops for a given volume. Two surface features that are signs that a preparatory decomposition is required are surfaces made up of three edges and one wherein additional edge is located at the vertex corner consisting of the three edges. The result is the direct production of 3, 4, and 5 sided extrusions excised from the sub-volume.

Figure 29:
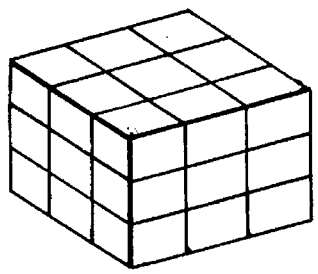
FIG. 29 is a schematic representation of a volume adjacency array where m=3, n=3, and p=3.
Figure 30:
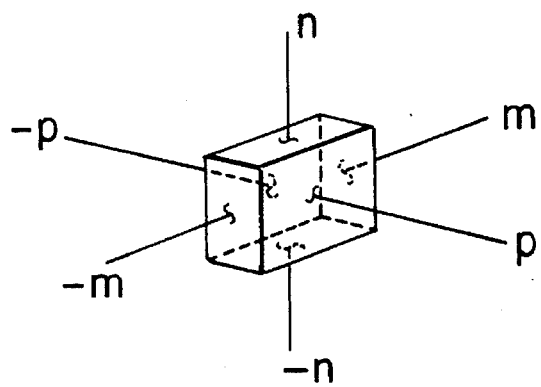
FIG. 30 is a schematic representation of an interior volume adjacency array element representing a sub-volume in terms of 6 generic surfaces which each have 4 edges.

The divider surfaces which are produced throughout the decomposition process must be placed in an order that corresponds to the location of each surface with respect to the original surfaces defining the volume and any other divider surface. This can be done by placing each sub-volume resulting from a decomposition into an array data structure element and labeling the sub-volume surfaces in reference to the corresponding divider surface. The array is called a volume adjacency array and is m×n×p in size where m>=1, n>=1, and p>=1 as shown in FIG. 29. There are three axis that are used to define each element indices and all three axis have two directions producing six positive and negative directions associated with the array axis. Each sub-volume surface that forms a boundary with another sub-volume can be labeled in terms of the axial direction it is perpendicular to and faces as shown in FIG. 30.

Being able to develop sub-volumes that are guaranteed to fit into a representational data structure as easy to use as an array is possible because any sub-volume decomposition is carried through adjacent sub-volumes that exist in the same array plane. The result is a grid produced from the repetition of the decomposition process that fills elements of an array with sub-volume data.

Volume adjacency array elements can be classified as two types, interior and exterior array elements. The sub-volumes associated with exterior elements of the array are the only elements that may contain surfaces that have any number of sides (any number between 2 and infinity) where volumes located within the array interior always have six four sided (four edged surfaces). The exterior elements can be classified in terms of the array exterior location. More specifically the location may be corner, edge, or surface as shown respectively in FIGS. 31A, 31B, and 31C.

Figure 31A:
FIGS. 31A–31C are respectively schematic representations of three possible exterior volume elements corresponding to the edges each respective surface element.
Figure 31B:
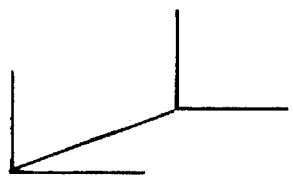
Figure 31C:
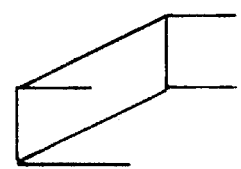
Figure 31D:
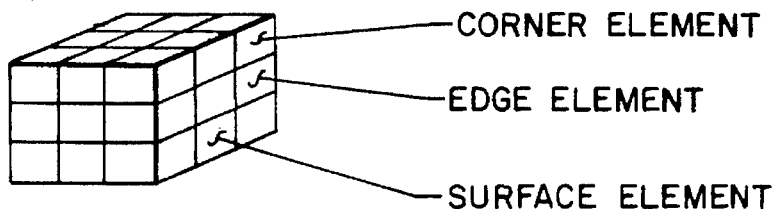
FIG. 31D is a schematic representation of a volume adjacency array incorporating the elements shown in FIG. 31A–31C.

The sub-volumes associated with each of the exterior types must meet certain requirements in order to be compatible with the volume adjacency array. The only requirement for corner elements is that there is one corner vertex with three edges that make contact with adjacent sub-volume edges as shown in FIG. 31A. Edge elements must have two corner vertices and one edge connecting each that makes contact with adjacent sub-volume edges within the array along that edge as shown in FIG. 31B. Surface elements must have four corners that form the vertex points of a 4 sided surface as shown in FIG. 31C. The surface is a boundary between the adjacent interior sub-volume in the array. There are many different combinations of surfaces defining a sub-volume that are located on the exterior of an array as shown in FIG. 31D. It is thus the case that the sub-volumes that may require decomposition will exist only on the exterior of the array. This means that any decomposition can be made on an element exterior and produce results compatible with the volume adjacency array.

It is probable that decomposing an exterior sub-volume would result in the generation of a divider surface that would need to pass through adjacent sub-volumes consistent with the array plane that the original decomposition took place in. This is done by using particular volume surfaces that form a base for orienting a continued decomposition called base surfaces.

Figure 32:
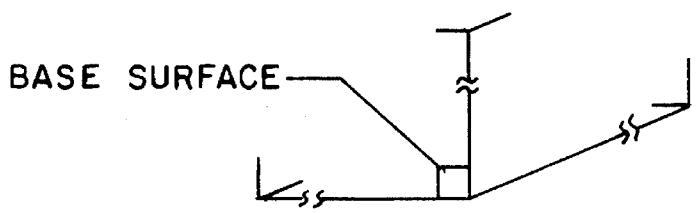
FIG. 32 is a schematic representation of a sub-volume base surface that is a sub-surface in a previously made divider surface where each edge belonging to an adjacent surface and contacting each vertex of the base surface is used to form a loop of edges that is a decomposition continuation surface.

Base surfaces as shown in FIG. 32 always form a boundary between two adjacent sub-volumes, is part of a sub-volume that results from a decomposition continuation, and is labeled with one of the six axial directions that labels the other base surfaces that are part of the sub-volumes lying in the same plane that the divider surface is being generated in. Each section of the divider surface that passes through the planar sub-volumes is defined using edges which begin and end on the sub-volume edges that contact the base surface vertices or create an extrusion along the base surface. Two sub-volumes result, one is an extrusion of the base surface and the other is the topological equivalent of the original sub-volume. The new sub-volume has to be placed into the volume adjacency array. An array shift can be made making room for the additional sub-volumes.

Figure 33:
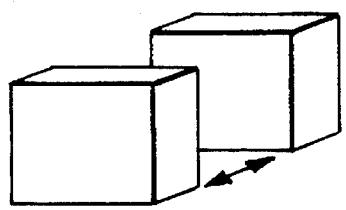
FIG. 33 is a schematic representation of an array shift of +1 for a new plane of sub-volumes along the axis which is perpendicular to a decomposition.
Figure 34:
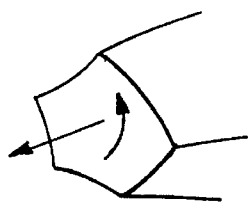
FIG. 34 is a schematic representation of a resulting positive normal vector to a surface derived from the enumeration of the surface edges and the right hand rule.

An array shift shown in FIG. 33 moves all of the elements of the volume adjacency array along the axis used to determine which sub-volume surface is a base surface plus one element starting at and including all elements in the array plane that the divider surface was generated in. This results in a planar section of empty elements used for the placement of the new sub-volumes that the base surfaces are a part of. The surface of these sub-volumes which are opposite the base surface has to be redefined with the same edge points being reordered in the opposite direction so that the outward pointing normal shown in FIG. 34 matches one of the three possible positive axial directions.

SUB-VOLUMES

Every decomposition process inherently generates two or more sub-volumes from every existing volume. Decomposition is a repetitive cycle that is continued until all of the sub-volumes consist solely of 3, 4, or 5 sided surfaces. There are three types of volumes that result from the repetition of the decomposition process, composite, symmetric and extrusion. Non-linear volumes are excised from the original volume by preparatory decomposition. Both the composite and symmetric types are then decomposed using specific rules that result in a type of sub-volume called extrusions.

COMPOSITE VOLUMES

Figure 35:
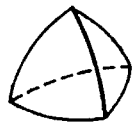
FIGS. 35, 36A–36B are respectively schematic representations of a #1 composite volume and 2 triangular extrusions into which it is separated. A composite volume is the set of volumes that can be directly decomposed into extrusions through successive decompositions of the resulting composite volumes.
Figure 36A:
Figure 36B:

Composite volumes such as those shown in FIGS. 35 and 36A–36B are volumes that are made up of combinations of 3, 4, or 5 sided surfaces. There are six composite volumes and each can be decomposed using generic divider surfaces compatible with the volume adjacency array. The complete decomposition of a composite volume results in sub-volumes that are extrusions of a 3, 4, or 5 sided surface along some path.

Figure 37A:
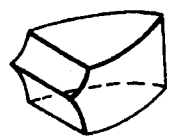
FIGS. 37A–37C are respectively schematic representations of a #2 composite volume and a 5 sided extrusion and a 3 sided extrusion into which it is separated.
Figure 37B:
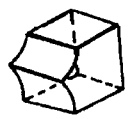
Figure 37C:
Figure 39A:
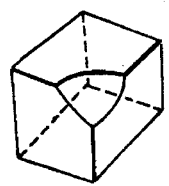
FIGS. 39A–39C are schematic representations of a #4 composite volume and a 3 sided extrusion and a #3 composite volume into which it is separated.
Figure 39B:
Figure 39C:
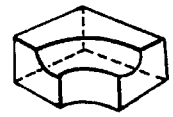

The decomposition of composite volumes differs from loop generation in that the edges of the divider surfaces used to decompose composite volumes have a defined surface placement with respect to any existing 5 sided surfaces or 3 sided surfaces that define the volume exterior. In the case of composite volumes having 3 sided surfaces at least one divider surface must be made that is 4 sided and has edges inclusive of all of the volume 3 sided surfaces. An example is shown in FIGS. 35, 37A, 39A for composite volumes (#1, #2, and #4) that have 3 sided surfaces resulting in sub-volumes that are extrusions and in the case of composite volume #4 shown in FIG. 39B an extrusion and a #3 composite volume.

Figure 38A:
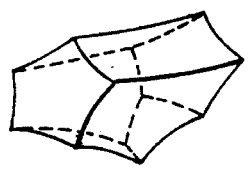
FIGS. 38A–38C are respectively schematic representations of a #3 composite volume and two 5 sided extrusions into which it is separated.
Figure 38B:
Figure 38C:
Figure 40A:
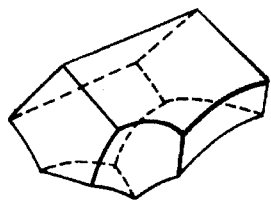
FIGS. 40A–40C are schematic representations of a #5 composite volume and the two #3 composite volumes into which it is separated.
Figure 40B:
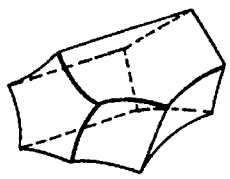
Figure 40C:
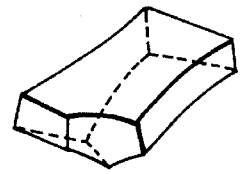
Figure 41A:
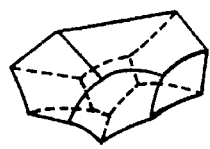
FIGS. 41A–41C are respectively schematic representations of a #6 composite volume and a #5 composite volume a #3 composite volume into which it is separated.
Figure 41B:
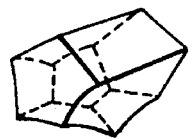
Figure 41C:
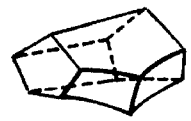

Composite volumes, as shown in FIGS. 38A, 40A and 41A, #3, #5, and #6 are composed of surfaces having 4 or 5 sides. These are decomposed with divider surfaces using the original composite volume surfaces that are 5 sided for composite volume #6, five sided with one four sided surface for one composite #5, and 5 sided for composite volume #3. The vertex formed by the two edges of each subsequent 5 sided surface along the divider curve loop must alternate on each side of the edges of the loop for each subsequent 5 sided surface it passes through. This insures that subdivision is a true decomposition and not just producing a generic copy of the original sub-volume.

Composite volumes can only exist as an exterior subvolume labeled by an outside volume adjacency array subelement. This means that any decomposition that takes place in a composite volume has to be continued through the original volume so that any of the surfaces used to base the new divider surface edges on are boundaries with other coplanar sub-volumes within the volume adjacency array. The decomposition continuation is carried out using base surfaces and the corresponding procedure which uses a base surface to decompose a sub-volume.

SYMMETRIC VOLUMES

Figure 42A:
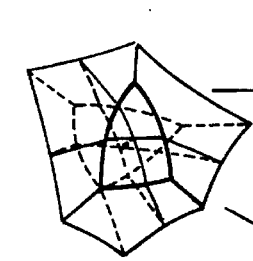
FIGS. 42A–42C are a schematic representations of a symmetric volume that can be decomposed into two #2 symmetric volumes and two #4 composite volumes using two 6 sided surfaces that create a symmetric arrangement of the 4 resulting sub-volumes about two divider surface intersection curves.
Figure 42B:
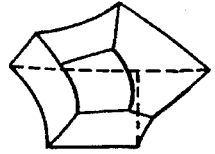
Figure 42C:
Figure 43A:
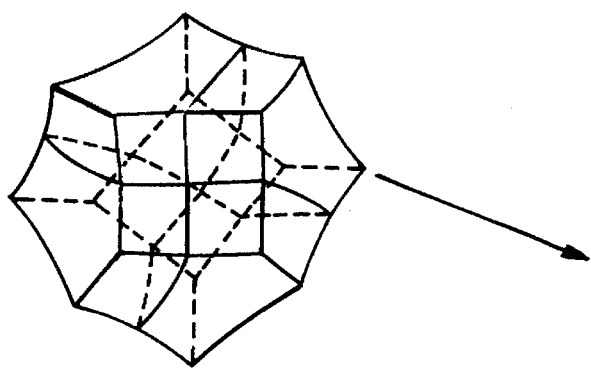
FIGS. 43A–43B are schematic representations of a #2 symmetric volume that can be decomposed into 4 #3 composite volumes using two 6 sided surfaces that create a symmetric arrangement of the 4 resulting sub-volumes about the curve defined by the intersection of two divider surfaces.
Figure 43B:
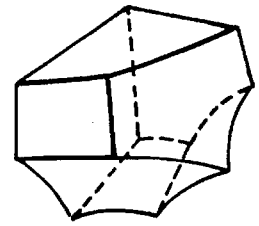
Figure 44A:
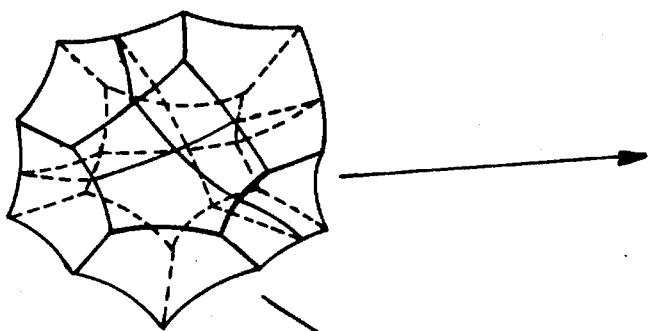
FIGS. 44A–44C are schematic representations of a #3 symmetric volume which can be decomposed into two #1 composite volumes and two #6 composite volumes using two 6 sided surfaces that create a symmetric arrangement of the 4 resulting sub-volumes about the two divider surfaces intersection curve.
Figure 44B:
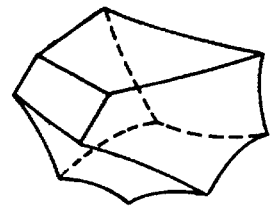
Figure 44C:
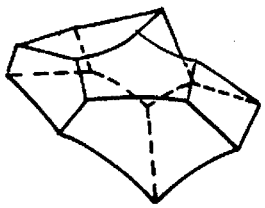

Symmetric volumes are composed of 3, 4, and 5 sided surfaces like composite volumes except that there are two surfaces having an equivalent number of sides that are not adjacent and are connected by 5 sided surfaces on each edge forming a volume as shown in FIGS. 42A, 43A and 44A. The decomposition of symmetric volumes is different from composite volume decomposition because it uses two divider surfaces that are 6 sided and placed into the symmetric volume at prescribed locations in order to insure decomposition of the volume. The two 6 sided surfaces intersect and form a curve that divides each into 4 surfaces with 5 sides. The decomposition of symmetric volumes results in composite volumes. In the case of the #1 symmetric volume the decomposition results in a two #2 symmetric volumes and a two #4 composite volumes.

NON-LINEAR

Figure 45A:
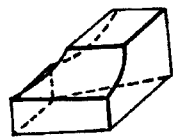
FIG. 45A illustrates a non-linear volume, that has a corner consisting of 4 edges, and illustrates the extrication of a non-linear extrusion.
Figure 45B:
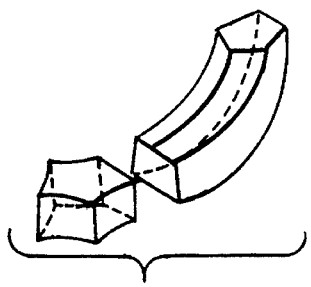
Figure 45C:
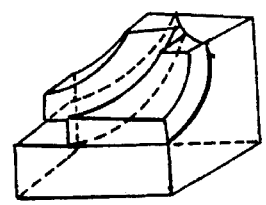
FIG. 45C is a schematic of the non-linear volume of FIG. 45A after extrication of the non-linear extrusion of FIG. 45B and further decomposition.
Figure 45D:
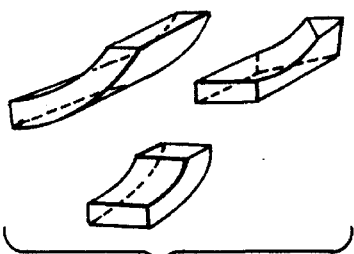
FIG. 45D is an exploded schematic similar to FIG. 45C.
Figure 46A:
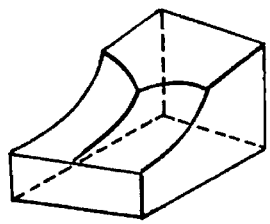
FIG. 46A is a schematic representation of a non-linear volume. As used herein a "non-linear volume" is a volume that has a vertex located on an edge of the volume coinciding with another edge.
Figure 46B:
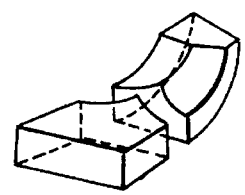
FIG. 46B is a schematic representation of a #2 non-linear extrusion that has been extricated from the volume shown in FIG. 46A.
Figure 46C:
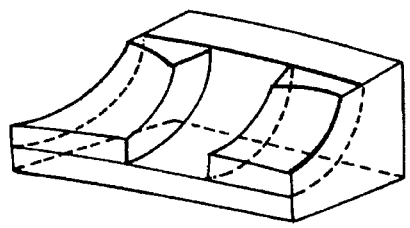
FIG. 46C is a schematic of the non-linear volume of FIG. 46A after extrication of the non-linear extrusion of FIG. 46B and further decomposition.
Figure 46D:
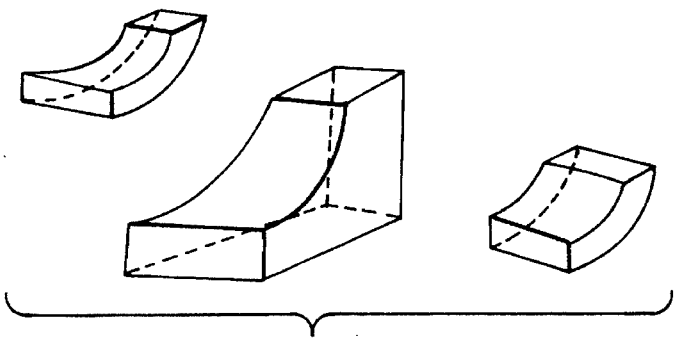
FIG. 46D is an exploded schematic similar to FIG. 46C.

Non-linear volumes are used to model surface features of continuums that cannot be part of continuous 3, 4, or 5 sided extrusions as shown in FIGS. 45A and 46A. These volumes are called non-linear because each contain extrusions that are discontinuous. Each non-linear volume has one non-linear extrusion which is L-shaped. One leg of the L-shape has 5 sides as shown in FIG. 45B and the other has 4 or 5 sides as shown in FIG. 46B. The intersection of the two legs has a discontinuity because the sides of the respective legs do not mesh precisely. The only part of the sides that do not mesh precisely are the three elements that form the cluster elements of the 5 sided extrusion face surfaces 100, 104 as shown in respectively in FIG. 47D and FIG. 47E. Both of the volumes shown in FIGS. 45A and 46A consist of the least number of extrusions that can define a volume around the non-linear surface features 120, 122 shown in FIGS. 45A, 46A produced by the non-linear extrusion within the volume.

The non-linear volumes illustrated in FIGS. 45A, 46A have been modeled for circumstances such as meshes around two intersecting drill holes that have respective axis intersecting at approximately a 90 degree angle as shown in FIG. 45A, or the intersection between a turbine blade and the hub of the rotor as shown in FIG. 46A. Information associated with each volume is in the form of special instructions used to initiate the decomposition of a volume that has a surface feature that is inherent in a volume that contains a non-linear extrusion. This was referred to previously as a preparatory decomposition. The instructions are a description of the sequence and location of divider surfaces that need to be generated in order to excise a non-linear surface feature, as seen in certain vertices from a non-linear volume while concurrently preparing the volume for decomposition. Decomposing non-linear volumes is compatible with maintaining the volume adjacency array. The non-linear volumes are defined first so that decomposition takes place prior to the excision of the non-linear extrusion. It is also compatible with finite element application theory. The discontinuities in the non-linear extrusion have a small void where the element clusters of the 5 sided surface extrusion end. This does not substantially alter the structural representation of the continuum and is comparable to the error that is caused by minor element distortion.

EXTRUSIONS

There are 4 types of extrusions. They are illustrated respectively in FIGS. 47A–47E and are referred to herein as being 3, 4, or 5 sided and non-linear. The 3, 4, or 5 sided extrusions are box shaped tubes made up of 4 sided surfaces used to define the edges of extrusion surfaces spaced at regular intervals. The extrusion surfaces defined by the edges at a particular interval are used to map a surface mesh of finite elements forming a face of a layer of hexahedron finite elements. Each surface has the same number of elements per edge. An extrusion has a number of elements along its length equivalent to the number of elements on each extrusion surface edge.

The extrusion surface definition process is linear, based on edges, with any change in the shape of the surface edges being linear throughout the four sided surface used to define the extrusion surface edges. Since each surface is defined by edges that have a linear change in shape as a function of four sided interpolation surface polynomial the result is a stacking of edges without abrupt changes that could form an interference between each extrusion surface. Because the extrusion surfaces are generated using linear mapping functions based on edge curves, the surfaces also have uniform smooth spacing between comparable points of adjacent extrusions. The surface meshes that are mapped on each extrusion surface consist of elements that have the optimum shape configuration. This results in the optimum finite element mesh for extrusions that do not have surfaces with an edge vertex tangent forming angles of less than 60 degrees to any path edge of the extrusion.

Non-linear extrusions as shown in FIGS. 47D and 47E are a configuration of two extrusions, where one is 5 sided, that meet at perpendicular angles. The 5 sided extrusion ends at the side of another extrusion essentially blending the 5 sided extrusion peak edge into a surface. Some of the elements in the 5 sided extrusion are not geometrically compatible with matching the side of the other extrusion. The cluster section of the five sided extrusions 100, 104 must end at the other extrusions side since it cannot be integrated with a mesh surface consisting of element rows as shown in FIGS. 47D, 47E. The abrupt stop in the extrusion creates a discontinuity in the mesh on the outside of the continuum being meshed. The change from the 5 sided extrusion into another mesh takes place at the edge point that has planes defined by local tangents on the two surfaces having an absolute angle between them that is halfway between the edges beginning and ending point local tangent angles between the same surfaces.

The size of the discontinuity can be controlled by varying the overall extrusion size. The smaller the extrusion the smaller the discontinuity. Decreasing the discontinuity size is a desirable goal. This can be achieved by using 4 and 5 side extrusions that always have four elements per side. By doing this the remaining elements that are produced by mesh refinement can be absorbed by adjacent 4 sided extrusions. This will result in the smallest possible discontinuity.

Figure 48A:
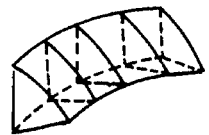
FIGS. 48A–48C are schematic representations of extrusion surfaces with 3, 4, or 5 sides placed throughout an extrusion.
Figure 48B:
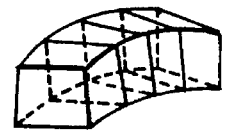
Figure 48C:
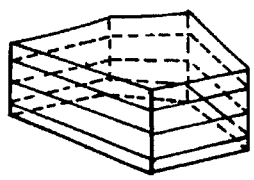

Extrusion surfaces shown in FIGS. 48A–48C are generated throughout the extrusion at evenly spaced intervals. Each surface has a finite element mesh mapped onto them using the procedures of the surface decomposition process. Each mesh is the optimum element configuration having the same even number of elements along each edge. Initially the number of elements placed along each surface side is 4. Mesh refinement is done by increasing the number of elements along each edge by increments of two to 6, 8, 10 . . . for every extrusion in the volume. The technique of incrementally adding 2 elements to each edge of the extrusion surfaces differs from using an element size parameter as in the case with surface decomposition that is less than some size limit for a given surface in that element size is not a parameter of volume decomposition.

DIVIDER SURFACES (REAL)

Generic divider surfaces are converted into surfaces with real edges that consist of points located on a surface. Divider surfaces are like any other surface where the interior is indirectly defined by the surface edges. Each edge can be defined using a combination of the information in the volume adjacency array and the results of surface decomposition process that defines each volume surface. This applies to the divider surfaces themselves because as soon as another divider surface intersects a previously generated divider surface a new edge is generated marking the physical representation of the intersection that is defined as data which is stored in a corresponding adjacent element of the volume adjacency array.

Divider surfaces are generated along each volume adjacency array axis in sequential order. All the divider surface edges beginning and ending points are spaced at equivalent distances on the corresponding volume edge. Surface edges cannot be generated directly from the data representation of another surface because the intersection points of the divider surface edges (these are the edges lying on the original volume surfaces) must be found numerically. The intersection itself takes place within the surface region defined by the surface primitive(s). Since an edge intersection takes place in a primitive it is possible to generically define the edge as a sequence of points that has end points marking the entrance and exit of the edge through each surface primitive(s). After the divider surface intersection points are found the intersection edge between the two points can be generated on the divider surfaces that were created previously.

The edges which mark the intersection of two divider surfaces are created per perpendicular axis of the volume adjacency array on surfaces defined by a previous axis. This is a convention that is used so that as many intersecting edges as possible are developed on the same surface providing a way to maintain continuity of the edge configurations relative to one another. The only difference between this and divider surface generation is that the entity created is not a surface defined by a group of edges, but simply one edge.

All edges are generated using one procedure. The procedure first describes a skeletal curve that is a path of line segments over a surface. The skeletal curve is then developed into mapped curve segments passing through each surface primitive.

There are two types of surfaces used to define an edge. One type is a surface that is a single primitive and the other type is a surface that is made up of more than one primitive.

Developing edges for a primitive is based on mapping points and developing smooth curve segments between the two points that begin and end at the edges that bound the primitive. The non-primitive surface type does not have 3, 4, or 5 sides. Developing an edge that lies on this surface type requires an iterative process that determines an edge path. By using nodes spread out over a surface to develop a tree data structure describing all possible surface node paths that begin and end on surface boundary edges, an edge having the shortest path can be generated and defined in terms of interconnected line segments. As a node is used it is labeled so that it is not used again in the same process of making edges relative to a perpendicular volume adjacency array axis.

Figure 49:
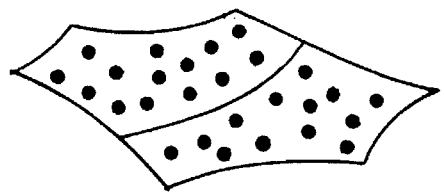
FIG. 49 is a schematic representation of element corner nodes mapped into the primitives of an original surface decomposition.

The nodes throughout the surface are the vertices of finite element meshes that are mapped into each primitive region of a surface shown in FIG. 49. The meshes have an equivalent number of nodes along each edge and are scaled down in size relative to the primitive so that no nodes are coincidental with the boundaries of the primitive. At this point the surface is considered to be a field of nodes surrounded by a web of surface primitive boundary edges.

Figure 50:
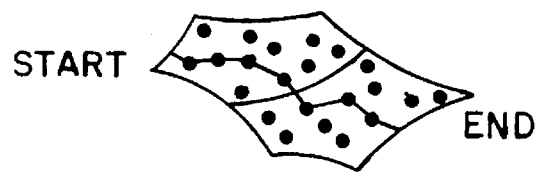
FIG. 50 is a schematic representation of a path of line segments passing through adjacent surface nodes that make up the shortest path between the starting and ending points on the boundaries of the original surface.
Figure 51:
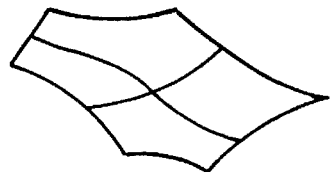
FIG. 51 is a schematic representation of a continuous surface edge made up of mapped geometrically smooth cubic interpolation polynomials converted from the path of line segments generated from adjacent surface nodes.

Tree data structures are used to find all of the nodes that define the shortest path out of all possible paths on a surface between the new edge starting and ending points. The nodes are selected, as a possible path point, based on the mesh connectivity for each primitive beginning from the boundary starting point. Bridges are made between the edge nodes of separate primitives when the current tree node is at an edge. This invokes a procedure which searches for the closest node located on a different primitive edge. The first tree path to contact the divider surface edge ending point is used as a skeleton shown in FIG. 50 of the new edge. Line segments that connect each node are used to find the point on a primitive edge within the surface that has the shortest distance to one of the path line segments. These points are the marks on each primitive edge where the newly formed curve passes through. The corresponding section of the edge is mapped into each primitive as shown in FIG. 51 with enough individual geometrically smooth cubic curve segments so that the contour of the surface is followed.

Figure 52:
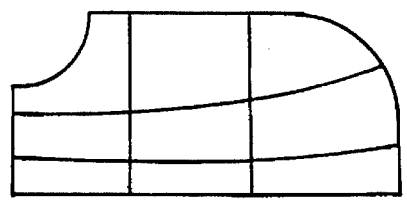
FIG. 52 is a schematic representation of sub-surfaces representing adjacent sub-volume surfaces within the volume adjacency array which is coincidental with one surface.

The repeated process of creating surface intersection edges corresponds to a concurrent development of sub-volumes that sub-divides a divider surface into a grouping of sub-surfaces in the form of surface links shown in FIG. 52. The final state of each link is in the form of 3, 4, and 5 sided surfaces located on a divider surface and have edges based on the contour of the original volume surfaces. The coordinates of each edge are stored with the sub-volumes with which it is associated.

OPTIMIZED 3 & 5 SIDED EXTRUSIONS

The sub-volumes that are represented in the volume adjacency array after the volume decomposition process is complete are 3, 4, or 5 sided extrusions. The configuration of each extrusion is a result of where the divider surfaces were located in the volume. Extrusions, like volumes in general, are easiest to develop a finite element mesh for if the edges making up the exterior surface are approximately equivalent in length. In this case the meshes that are mapped onto each extrusion surface can have an equivalent number of elements on each edge where each mesh element can be optimized with the procedures used in the surface decomposition process. The more likely scenario however is that the extrusions will not have approximately equivalent edge lengths and therefore will be distorted. Extrusion distortion is unacceptable in the 3 or 5 sided extrusions because the element clusters used in both meshes are already distorted to a specified limit. Resolution of this problem requires an optimization of the 3 and 5 sided extrusions that make up a volume.

Figure 53C:
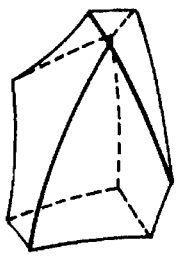
FIGS. 53A–53C are schematic representations of various 5 sided extrusions that illustrate minor to extreme distortions. Distortions can be measured as the net change in proportionality between extrusion surface edges along the axial extent of the extrusion path.
Figure 54C:
FIGS. 54A–54C are schematic representations of various 3 sided extrusions that illustrate minor to extreme distortions. Distortions can be measured as the net change in proportionality between extrusion surface edges along the axial extent of the extrusion path.
Figure 53B:
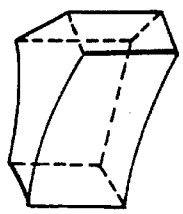
Figure 54B:
Figure 53A:
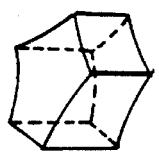
Figure 54A:
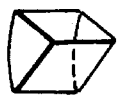

Extrusion distortions can vary from cases where the distortion is slight to configurations which are completely impossible to divide into a mesh. FIG. 53 and FIG. 54 are illustrations of 3 and 5 sided extrusions which go from an extrusion that can be optimized to an extrusion where the distortion is so great that there is no possibility to develop an extruded finite element mesh as shown in FIGS. 53C, 54C. The extrusions shown in FIGS. 53A, 54A are the extrusion types that would result from a volume having original surfaces with edges of approximate length.

The degree of distortion of an extrusion can be ascertained in terms of the proportionality of the extrusion surface side lengths. For example, the volume shown in FIGS. 53A, 54A has extrusion surface side lengths that are more proportional than those shown in FIGS. 53B, 54B, 53C, 54C. The volume shown in FIGS. 53B, 54B has greater proportionality of extrusion surface side lengths than the volume of FIGS. 53C, 54C. It will be understood that the extrusion shown in FIG. 53A has 5 sides and FIG. 54A has 3 sides, In other words the illustrated volumes are an axial sections of an extrusion. The extrusion of FIG. 53A has side surface lengths that are substantially equal and this is the characteristic of a proportional undistorted extrusion.

If there is a disproportion between edge lengths that goes beyond the limit that is considered acceptable and the extrusion is 3 or 5 sided then the extrusion surfaces are sub-divided into 3 or 5 sided sub-surfaces that have edges of approximately the same length. The process is similar with respect to each 5 sided extrusion surface to the optimization procedure used in the surface decomposition process except that the new edges(s) are placed on the extrusion surface edges based on length rather than element vertex positions.

Figure 55:
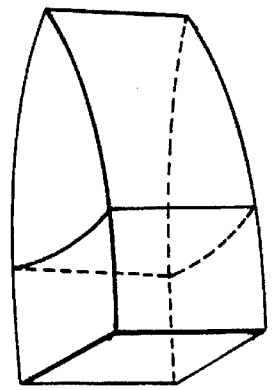
FIG. 55 is a schematic representation of a 3 sided sub-extrusion and a 4 sided extrusion defined within a distorted 3 sided extrusion for the purpose of absorbing surface distortions in the 4 sided extrusion.

A three sided sub-surface is placed into distorted three sided extrusion surfaces so that the remaining 4 sided extrusion surfaces absorb most of the distortion for each volume as shown in FIG. 55. The extrusion surfaces at each end of the extrusion are tested to verify whether a sub-surface is required by comparing the shortest edge length with the other two surface edge lengths. If the distance remaining from the subtraction of the shortest edge length is greater than ¼ of the shorter of the two other edges for both end extrusion surfaces then a 3 sided sub-surface is placed into each extrusion surface based on the vertex, which are end points to one common edge along the extrusion of what are the two longer edges of both end surfaces. The curve which divides the 3 sided surface into 3 and 4 sided sub-surfaces is positioned on points of the two longer edges of each extrusion surface at a distance equivalent to the length of the shortest end extrusion surface edge plus an increment that is proportional to the parametric difference of the two end surface lengths as a function of the total number of extrusion surfaces placed at edge point locations starting from the surface vertex coincidental with a common edge. The result is a 3 sided sub-surface having approximately equal side lengths on each extrusion surface and a 4 sided sub-surface that absorbs whatever distortion there may be left over.

Figure 56:
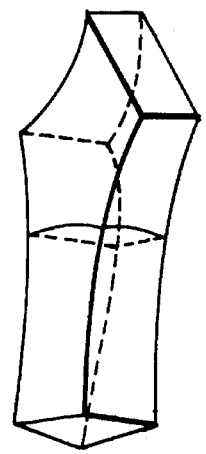
FIG. 56 is a schematic representation of a 5 sided sub-extrusion defined and a 4 sided extrusion within a distorted 5 sided extrusion surface whereby surface distortions are absorbed by the 4 sided extrusions.

A five sided sub-surface is placed into distorted five sided extrusion surfaces so that the remaining 4 sided extrusion surface(s) absorb most of the distortion for each volume as shown in FIG. 56. The procedure for developing the 5 sided sub-surface is similar to the procedure used with surface decomposition with two exceptions. The placement of the edges that sub-divide each extrusion surface is based on a position derived from relative edge lengths and not element vertices. The second is that all of the resulting sub-surfaces have an equivalent even number of elements on all of the edges. Testing in order to verify whether 5 sided sub-surfaces are required is based on the two end extrusion surfaces where the sub-surfaces are first developed and each 4 sided sub-surface extrusion is only kept if at least one of the 4 sided sub-surface edges is greater than half of the average length of all the 5 sided sub-surface edges. Each new edge used to define the sub-surfaces is placed on the surface using the same proportionality rule as for the 3 sided sub-surfaces in an extrusion.

The sub-division of a 3 and 5 sided extrusion surface may involve sub-dividing a surface that is a border with another extrusion which is adjacent to another sub-volume. Because there is an increase in the number of elements along the edges of an extrusion surface the element increase must be matched on the adjacent extrusion. The continuation of the sub-division of extrusion surfaces through other extrusions that are adjacent to the sub-divided extrusion can be done by considering each sub-division extrusion surface curve to be part of a larger surface divider surface. This can be done by decomposing the sub-volumes with base surfaces and is identical to any divider surface generation in accordance with the decomposition process.

The remaining extrusions throughout the volume can be meshed. After obtaining a fully meshed volume each finite element has to be defined in terms of connectivity and coordinates. This is a standard way of representing a finite element mesh.

VOLUME DECOMPOSITION PROBLEMS

The volume decomposition process has one main drawback that is based on the fact that this process uses only extrusions of 3, 4, and 5 sided surface meshes. This type of process has the inherent restriction of needing an approximately uniform cross section along each extrusion path. The result is a limitation that only volumes with a relatively slight deviation from having original surface edges with approximately equivalent lengths are not easy to decompose into the optimum finite element mesh. This may seem like a large limitation but in view of the fact that to develop a volumetric finite element mesh by hand is a time consuming and difficult task, the ability to develop a finite element mesh for any class of volumes is significant.

There are some problems which can be associated with this process regardless of whether a volume has an optimum configuration or not. These problems do not fall into a solution category that can be remedied using some property or procedure of the surface or volume decomposition process. The problem is that more than one non-linear volumes in close proximity cannot be excised from a volume using divider curves without adjusting the exact position of each because the non-linear extrusion should be kept as small as possible in comparison to the rest of the volume.

Figure 57:
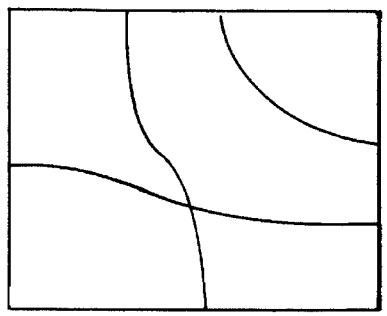
FIG. 57 is a schematic representation of a divider surface edge segments mapped into a 4 sided primitive where two of the curves do not intersect at 90 degree angles.

The last problem has to do with the result of mapping divider surface edges that intersect in a surface primitive. The edge segments may not intersect at 90 degree angles. There are some cases such as those shown in FIG. 57 where it is difficult to achieve a mesh without making curves that have compound curvatures which may distort the mapped surface mesh corresponding to that primitive more so than before the curve intersections were adjusted.

VOLUME DECOMPOSITION PRODUCT

The volume decomposition process produces an optimum finite element mesh composed entirely of hexahedron elements. Hexahedron elements are universally recognized as the best basis for a three dimensional analysis. Some systems create finite element meshes using tetrahedron or prism elements. This process does also because a mesh consisting of the optimum tetrahedron elements could be developed by sub-dividing hexahedron elements into six tetrahedron elements. The process produces a mesh containing the largest possible element size for a given volume. By doing this an efficient basis for testing convergence is possible. Any increase in the number of elements within the volume would have the effect of refining the mesh.

The finite element mesh is defined by connectivity and nodal point coordinates. A file is created which has a listing of each element by global node numbers. Each node is listed at the end of the file with x,y,z coordinates defining its position. The file is in a text format so that a separate analysis package can be used. In practice this works well and poses no limitations as to what analysis package is to be used.

MULTIPLY CONNECTED SURFACES AND VOLUMES

Multiply connected surfaces and volumes are decomposed in the same general manner as the regular decomposition process in an accordance with the invention. The process relies on an imaginary split of the surface or the surfaces of the column so that the remainder is one length of a surface of a volume that is not multiply connected.

Surfaces

Figure 58:
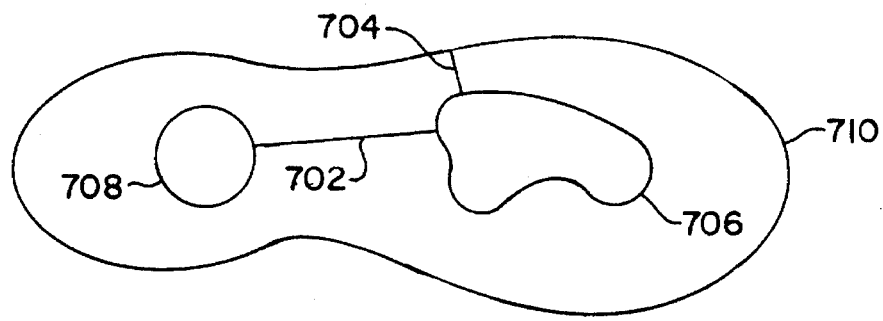
FIG. 58 is a schematic representation of a multiply connected surface showing divider curves that decompose the surface into a regular surface to be decomposed using surface decomposition in accordance with the invention.

Multiply connected surfaces such as that shown in FIG. 58 are defined like any other surfaces except that the interior surface boundary point numbering is switched. More particularly the points are numbered in descending order rather than ascending order. The surface is then decomposed by providing a linkage such as 702 joining interior surfaces 704 and 708 in FIG. 58. A linkage as used herein is a series of connections between interior surfaces using divider curve base lines that include a divider curve base line and an outer boundary. Some surfaces will require more than one linkage. The linkage in FIG. 58 consists of interior surfaces 708, 706 and divider curve base lines 702, 704.

The divider curve end point tangents are constructed like tangents of an original surface boundary edge except whenever an endpoint contacts an inner boundary the local plane of the inner surface at the contact point of the inner boundary and the divider curve base line is used to project the divider base line into the plane. This is done so that the contours of the surface has the appearance as if the interior surfaces were cut out from the original surface. Those skilled in the art will recognize that all other procedures thereafter are the standard procedures described above.

The surface is not multiply connected after the links between the interior surfaces and outer boundary have been made with divider curves. By considering the divider curves to be two separate boundaries that are coincident the surface can then be decomposed as though it were a longer version of the original multiply connected surface.

Volumes

Figure 59:
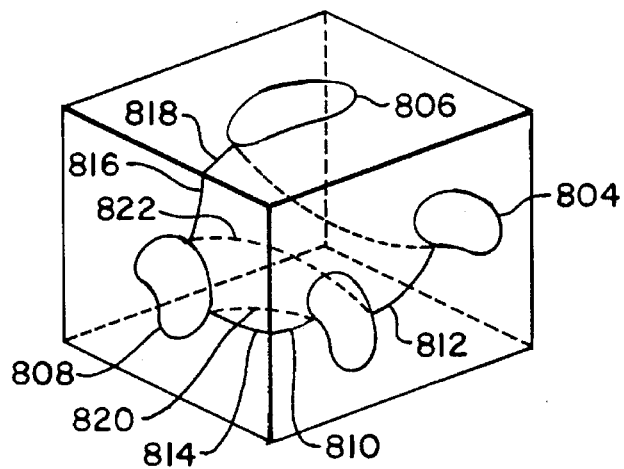
FIG. 59 is a schematic representation of a multiply connected volume showing divider curves that decompose the volume into a regular volume to be decomposed using the volume decomposition procedures in accordance with the invention.

Multiply connected volumes as shown in FIG. 59 are defined like solid volumes. They are more complex because the surfaces thereof can be multiply connected and there may be holes in the volume defined by other inner surfaces bounded by the outer surface boundaries. Modeling such a volume would require interactive graphics capabilities in order to properly define the surfaces within the volume interior.

The surfaces that define the holes within the volumes cannot be defined simply by interior surface boundary edges because there are not enough boundaries to insure that the position is unique and definite. Multiply connected volumes are decomposed so that divider surfaces are defined by edges that form a continuous linkage all around the volume shown in FIG. 59. The edges 816, 822, 812, 824, 818, and 820, 810, 814 define the divider surfaces. The divider curve endpoints of one complete linkage are matched between the opposing ends of each edge to form complete surfaces 820, 822, 824. Edges of the volume are considered as edges between two primitives so that skeleton curves can be generated through an edge as though it were simply a division between the two primitives.

The surface of the volume containing the greatest number of interior surfaces is decomposed using the multiply connected surface decomposition procedures. This process is carried out repeatedly until all the interior surfaces have been made part of an edge linkage that bounds a surface.

The volume is not multiply connected after the divider surfaces have been placed in the volume so that it becomes a longer version of the original. Each divider surface is considered to be two surfaces that happen to be coincidental. The volume can then be decomposed using the volume decomposition process.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. A method for defining finite elements in a surface for ultimately predicting a physical characteristic of the surface, which method comprises:

providing a computer system having a computer connected to an input device, to an image display screen and to a storage file, the storage file including instructions and data for at least steps (iii) through (xi) of said method;

(i) inputting, through the input device, surface boundary point coordinates of a geometric model of a surface;

(ii) displaying a surface object on the image display screen, the surface object consisting of the geometric model of the surface;

(iii) preparing boundary edges of the surface object by generating piecewise geometrically smooth bezier curves between boundary points and converting the bezier curves to cubic interpolation polynomials and defining evenly spaced points on each cubic interpolation polynomial;

(iv) decomposing the surface object with divider curves, if the surface object is not already 3, 4, or 5 sided, into 3, 4, and 5 sided primitives;

(v) determining a largest acceptable element size;

(vi) determining a number of elements disposed along each edge of each primitive; and (vii) readjusting one of the divider curves to match closest even element vertices;

(viii) mapping in 3 and 5 sided clusters;

(ix) preparing remaining 4 sided primitives for decomposition into 4 sided elements;

(x) mapping in elements and element patches to develop a mesh from the surface object;

(xi) optimizing the elements in the mesh; and (xii) writing the mesh having the optimized elements to the storage file.

2. The method as described in claim 1 further including:

if all sub-surfaces thereof remaining after definition of primitives are not already 3, 4, or 5 sided, into 3, 4, and 5 sided primitives includes:

considering a first sub-surface making up the surface that is not 3, 4, or 5 sided;

generating a straight line base of a divider curve;

if no resulting sub-surface is a trivial surface then generating a divider curve; and if a resulting surface is a trivial surface then decomposing the trivial surface.

3. The method as described in claim 2 wherein the step of decomposing the trivial surface includes:

if one of the resulting sub-surfaces is trivial then place an alternative extruded divider curve between the two longest edges of the sub-surface containing the shortest boundary edge;

considering the part of the trivial surface that is not composed of the shortest boundary edge and generating a straight line base of divider curve;

verifying successful decomposition of the sub-surface;

if decomposition of the trivial surface is unsuccessful then moving the alternative extruded divider curve along the two longest boundary edges away from the shortest base surface edge; and if decomposition is successful generating a divider curve.

4. The method as described in claim 3 wherein the decomposition of the trivial surface includes:

generating a straight line base of a divider curve;

finding two points not located on the extent of any two adjacent boundaries that are the closest together of any other corresponding two points on the boundaries of the surface;

testing the resulting line segment to verify if both ends form angles which are substantially between 80 and 100 degrees with the surface boundary tangents; and if these angles are not substantially between 80 and 100 degrees then excluding these two points.

5. The method as described in claim 4 wherein the step of preparing the boundary edges includes:

generating piecewise geometrically smooth bezier curves between the boundary points convert bezier curves to cubic interpolation polynomials; and defining evenly spaced points on each cubic interpolation polynomial.

6. The method as described in claim 5 wherein the step of determining the largest acceptable element size includes:

finding the primitive edge having the shortest length; and divide the primitive edge having the shortest length by 4 using the resulting number as the largest possible element size for the surface.

7. The method as described in claim 6 wherein the step of determining the number of elements disposed along each edge of each primitive includes:

specifying the largest element size;

if the specified element size is greater than the largest possible element size then repeat the preceding step;

if the specified element size is less than the largest possible element size calculate the nearest even number of elements along each primitive edge by dividing each edge length by the given element size and rounding the result off to the nearest even number.

8. The method as described in claim 7 wherein the step of readjusting one of the divider curves includes:

considering the next to last, in order of creation, divider curve that has been previously defined;

if one of the endpoints of this divider curve contacts a previously created divider curve then relocate this divider curve end point so that it is compatible with the vertex of an even element located on the previously divider curve; and sequentially consider the next divider curve, in opposite order of creation, if one of the endpoints contacts a previously created divider curve then relocate this divider curve end point so that it is compatible with the vertex of an even element located on the previously created divider curve.

9. The method as described in claim 8 wherein the step of mapping in 3 and 5 sided clusters includes:

optimizing the 3 and 5 sided primitives by optimizing the shape of the 3 and 5 sided clusters in the 3 and 5 sided primitives;

mapping 3 and 5 sided clusters into the 3 and 5 sided primitives;

generating the remaining 4 sided primitives in each 3 and 5 sided primitive.

10. The method as described in claim 9 wherein the step of preparing the remaining 4 sided primitives for decomposition into 4 sided elements includes:

splitting each 4 sided primitive into patch halves;

generating layers in each half;

storing the layers in the order of the decreasing difference between opposing edge lengths along the corresponding patch half axis;

calculating the nearest even number of elements along each layer edge perpendicular to the corresponding patch axis by dividing each edge length by the given element size; and determining the number of and direction of patches per layer.

11. The method as described in claim 10 wherein the step of mapping in elements and element patches includes:

placing element patch configurations into each layer in the descending order of the difference between opposing edge lengths repeatedly until the difference in the number of elements on each patch half opposing edge is matched; and mapping in the remainder of the layers with 2×N filler elements where N is any even integer greater than zero.

12. The method as described in claim 11 wherein the step of optimizing the elements in the mesh includes the steps of sequentially:

optimizing all 3 sided cluster elements;

optimizing all 5 sided cluster elements; and optimizing all elements having sequential included angles of substantially 60–90–120–90 degrees in each element patch configuration to more nearly have a more precise 60–90–120–90 degree angular relationship.

13. A method for defining finite elements in a volume for ultimately predicting a physical characteristic of said volume, which method comprises:

(i) providing a computer system having a computer connected to an input device, to an image display screen and to a storage file, the storage file including instructions and data for at least steps (iv) through (xviii) of said method;

(ii) inputting, through the input device, surface boundary point coordinates of a geometric model of each surface of a volume;

(iii) displaying on the image display screen a surface object for each surface of the volume, each surface object consisting of the geometric model of the surface;

(iv) inputting points defining boundaries of each surface of the volume to produce an outward pointing normal away from an interior of the volume;

(v) setting up an initial surface adjacency description for the volume;

(vi) initializing a volume adjacency array;

(vii) excising non-linear extrusions from the volume;

(viii) decomposing remaining sub-volumes not having 3, 4, or 5 sides into volumes with 3, 4, or 5 sides;

(ix) decomposing any composite sub-volumes;

(xi) decomposing any symmetric sub-volumes;

(xii) generating real divider surfaces for each volume adjacency array axis;

(xii) converting sub-volume data to an extrusion volume data format;

(xiii) optimizing all three sided extrusions;

(xiv) optimizing all five sided extrusions;

(xv) determining a number of elements per extrusion edge;

(xvi) generating extrusion surface;

(xvii) mapping in elements and element patches into the extrusion surfaces to develop a mesh from each surface object of the volume;

(xviii) converting the volume to hexahedron elements; and (ixx) writing the mesh to a file in the storage file.

14. The method as described in claim 13 wherein the step of excising non-linear extrusions from the volume:

if the volume has any edges that are associated with one of the non-linear volumes or has at least one 3 sided surface and is not already a 3 sided extrusion then begin placement of the generic divider surfaces for the decomposition of the corresponding sub-volume from a data file;

creating all the generic divider surfaces that are necessary to excise the non-linear volume or a 3 sided extrusion from the volume;

continuing decomposition through the volume adjacency array;

if there is a non-linear volume then breaking existing non-linear extrusions into 4 and 5 sided extrusions;

continuing the decomposition through the volume adjacency array; and considering another non linear sub-volume or a sub-volume with at least one surface that has 3 edges.

15. The method as described in claim 14 wherein the step of decomposing remaining sub-volumes without 3, 4, or 5 sides into volumes with 3, 4, or 5 sides includes:

repetitively, for each sub-surface of the sub-volume not having 3, 4, or 5 edges and has the greatest number of edges of any other surface in the sub-volume, generating the generic divider surface that has the greatest number of sides for the sub-volume starting it on the largest surface edges.

16. The method as described in claim 15 wherein the step of decomposing any composite sub-volumes;

if any sub-volume is a composite volume then creating a generic divider surface for the composite sub-volume;

continue decomposition through the volume adjacency array; and consider another composite volume from the volume adjacency array.

17. The method as described in claim 16 wherein the step of decomposing any symmetric sub-volumes includes:

create generic divider surfaces.

18. The method as described in claim 17 wherein the step of generating real divider surfaces includes:

defining the original surfaces of the volume using surface decomposition;

if there are any divider surfaces then plotting N×N meshes into each original surface primitive and calculate the spacing of each divider surface edge along the original surface edges;

generating skeleton curves for the new divider surfaces on the original volume surfaces;

mapping all the divider surface edges into the original volume surface primitives based on the skeleton curve entry and exit points of the surface primitives;

if there is more than one axis of the volume adjacency array then locating any divider surface edge intersection points edge within each original surface primitive;

if there is a first axis of divider surfaces then defining the surfaces along a first axis with the new edges;

if there is a second axis of divider surfaces then defining the divider surfaces and the curves resulting from surface intersection with the surfaces along the first axis as skeleton curves beginning and ending at the corresponding divider surface edge intersection points defined within the original volume surface primitives; and if there is a third axis of divider surfaces then defining the divider surfaces and the curves resulting from surface intersection with the first and second axis surfaces as skeleton curves using the same points on the first and second surfaces intersection curves as one of the corner vertices for the resulting sub-surfaces.

19. The method as described in claim 18 wherein the step of optimizing all three sided extrusions includes:

if a sub-volume is a first three sided extrusion then begin optimizing the first 3 sided extrusion;

continuing decomposition through the volume adjacency array;

sequentially optimize other sub-volumes from the volume adjacency array that are 3 sided extrusions.

20. The method as described in claim 19 wherein the step of optimizing all five sided extrusions includes:
  if a first sub-volume is a five sided extrusion then begin optimizing the first 5 side extrusion;
  continuing decomposition through the volume adjacency array;
  sequentially optimizing other sub-volumes from the volume adjacency array that are 5 sided extrusions.

21. The method as described in claim 20 wherein the step of determining the number of elements per extrusion edge:
  inputting the number of elements per extrusion surface edge;
  if the number of elements is less than 4 and not an even number then repeatting the preceding step.

22. The method as described in claim 21 wherein the step of converting the volume to hexahedron elements includes:
  mapping 3, 4, or 5 sided meshes onto the extrusion surfaces;
  optimizing the elements for each extrusion surface; and
  converting the mesh into hexahedron elements.

* * * * *